(12) United States Patent
Kitamura et al.

(10) Patent No.: US 7,548,290 B1
(45) Date of Patent: Jun. 16, 2009

(54) POLARIZING PLATE WITH OPTICAL COMPENSATION LAYER AND IMAGE DISPLAY APPARATUS USING THE SAME

(75) Inventors: Yoshitsugu Kitamura, Osaka (JP);
Katsunori Takada, Osaka (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

(21) Appl. No.: 11/994,448

(22) PCT Filed: Nov. 24, 2006

(86) PCT No.: PCT/JP2006/323390

§ 371 (c)(1),
(2), (4) Date: Jan. 2, 2008

(87) PCT Pub. No.: WO2007/061027

PCT Pub. Date: May 31, 2007

(30) Foreign Application Priority Data

Nov. 28, 2005 (JP) .............................. 2005-341547

(51) Int. Cl.
*G02F 1/1335* (2006.01)
(52) U.S. Cl. .......................... 349/96; 349/117; 428/1.33
(58) Field of Classification Search ....................... None
See application file for complete search history.

(56) References Cited

U.S. PATENT DOCUMENTS

| | | | |
|---|---|---|---|
| 6,340,999 B1 * | 1/2002 | Masuda et al. ................ 349/63 |
| 6,717,637 B1 | 4/2004 | Yoon et al. | |
| 2001/0007487 A1 | 7/2001 | Yoon et al. | |
| 2001/0052948 A1 | 12/2001 | Okamoto et al. | |
| 2003/0210362 A1 | 11/2003 | Yoon et al. | |
| 2005/0231660 A1 | 10/2005 | Fujita et al. | |
| 2005/0243248 A1 | 11/2005 | Yoon et al. | |

FOREIGN PATENT DOCUMENTS

| | | |
|---|---|---|
| JP | 11-242226 A | 9/1999 |
| JP | 2001-209065 A | 8/2001 |
| JP | 2005-139304 A | 6/2005 |
| JP | 2005-164809 A | 6/2005 |
| JP | 2005-326818 A | 11/2005 |

OTHER PUBLICATIONS

International Search Report for PCT/JP2006/323390, date of mailing Feb. 27, 2007.

* cited by examiner

*Primary Examiner*—Richard H Kim
(74) *Attorney, Agent, or Firm*—Westerman, Hattori, Daniels & Adrian, LLP.

(57) ABSTRACT

The polarizing plate with an optical compensation layer of the present invention includes: a hardcoat layer; a polarizer; a first optical compensation layer placed so that a slow axis thereof intersects with an absorption axis of the polarizer; and a second optical compensation layer placed so that a slow axis thereof intersects with the absorption axis of the polarizer in the stated order, wherein: the first optical compensation layer provides a substantially ½ retardation with respect to a wavelength of monochromatic light; the second optical compensation layer provides a substantially ¼ retardation with respect to a wavelength of monochromatic light; and the hardcoat layer contains urethaneacrylate, polyol (meth)acrylate, and (meth) acrylic polymer having an alkyl group containing at least two hydroxyl groups. The polarizing plate with an optical compensation layer of the present invention may suitably be used for various image display apparatuses (such as a liquid crystal display apparatus and a self-luminous display apparatus).

13 Claims, 5 Drawing Sheets

CHANGE AMOUNT OF RETERDATION 【60°C95%RH】

POLARIZING PLATE WITH OPTICAL COMPENSATION LAYER AND IMAGE DISPLAY APPARATUS USING THE SAME

TECHNICAL FIELD

The present invention relates to a polarizing plate with an optical compensation layer and an image display apparatus using the same. More specifically, the present invention relates to a polarizing plate with an optical compensation layer, which does not require a cover plate, contributes to the reduction in thickness, is excellent in abrasion resistance, moist heat resistance, and viewing angle compensation, exhibits circularly polarized light in a wide-band, prevents heat non-uniformity (heat fluctuation), and suppresses light leakage in a black display, and an image display apparatus using the polarizing plate with an optical compensation layer.

BACKGROUND ART

As one of image display apparatuses, there is known a liquid crystal display apparatus. Along with the technological innovations including wide viewing angle, high definition, high-speed response, and color reproducibility of the liquid crystal display apparatus, the application of the liquid crystal display apparatus has also been spread from a laptop computer and a monitor to a television, a mobile telephone, and further to a personal digital assistant (PDA). According to a basic configuration, the liquid crystal display apparatus includes a liquid crystal cell in which a pair of glass substrates each having a transparent electrode are opposed to each other with a predetermined interval via spacers and a liquid crystal material is sealed between the glass substrates, and polarizing plates arranged on both sides of the liquid crystal cell.

For example, in middle and small-sized liquid crystal display apparatuses used in the mobile telephones and the PDAs, a semi-transmissive reflection-type liquid crystal display apparatus has been proposed in addition to a transmission-type liquid crystal display apparatus and a reflection-type liquid crystal display apparatus (for example, see Patent Documents 1 and 2). The semi-transmissive reflection-type liquid crystal display apparatus uses ambient light in a bright place in the same way as in the reflection-type liquid crystal display apparatus, and enables a display to be recognized visually with an internal light source such as a backlight in a dark place. In other words, the semi-transmissive reflection-type liquid crystal display apparatus adopts a display system having both a reflection type and a transmission type, and can switch between a reflection mode and a transmission mode depending upon the lightness of the environment. As a result, the semi-transmissive reflection-type liquid crystal display apparatus can perform a clear display even in a dark environment while reducing power consumption, so it is preferably used in a display part of mobile equipment.

A specific example of the semi-transmissive reflection-type liquid crystal display apparatus described above includes a liquid crystal display apparatus, for example, in which a reflective film obtained by forming a window portion for light transmittance in a metal film such as aluminum is provided on an inner side of a lower substrate, and the reflective film is allowed to function as a semi-transmissive reflective plate. In the liquid crystal display apparatus described above, in a reflection mode, outer light incident from an upper substrate side passes through the liquid crystal layer, is reflected from the reflective film on the inner side of the lower substrate, passes through the liquid crystal layer again, and is outgoing from the upper substrate side, thereby contributing to a display. On the other hand, in a transmission mode, light of a backlight incident from the lower substrate side passes through the window portion of the reflective film, passes through the liquid crystal layer, and is outgoing from the upper substrate side, thereby contributing to a display. Thus, in a reflective film formation region, an area where the window portion is formed functions as a transmission display region, and the other area functions as a reflection display region.

On the other hand, the liquid crystal display apparatus uses an optical film made of various polymer materials as an optical compensation layer for the purpose of enhancing image quality, as well as a polarizing plate. The optical compensation layer is selected appropriately based on the display mode (TN, VA, OCB, IPS, ECB, etc.) of liquid crystal. As such an optical compensation layer, for example, a uniaxially stretched film of a polymer film is known.

In the above-mentioned conventional liquid crystal display apparatus, a cover plate made of glass (thickness: about 0.5 mm) or a thick plastic sheet is provided on an outer side of a polarizing plate to prevent the damage of the polarizing plate. However, in middle and small-sized liquid crystal display apparatuses required to be reduced in thickness and weight, it is not preferred to provide such a cover plate. Further, it can be assumed that the middle and small-sized liquid crystal display apparatuses are used under severe conditions (for example, high temperature and high humidity), so moist heat resistance is also required.

Patent Document 1: JP 11-242226 A

Patent Document 2: JP 2001-209065 A

DISCLOSURE OF THE INVENTION

Problems to be Solved by the Invention

The present invention has been made in view of solving the above-mentioned conventional problems, and an object of the present invention is to provide a polarizing plate with an optical compensation layer, which does not require a cover plate made of glass or the like, contributes to the reduction in thickness, is excellent in abrasion resistance, moist heat resistance, and viewing angle compensation, exhibits circularly polarized light in a wide band, prevents heat non-uniformity, and suppresses light leakage in a black display, and an image display apparatus using the polarizing plate with an optical compensation layer.

Means for Solving the Problems

According to one aspect of the invention, a polarizing plate with an optical compensation layer is provided. The polarizing plate with an optical compensation layer includes: a hardcoat layer; a polarizer; a first optical compensation layer placed so that a slow axis thereof intersects with an absorption axis of the polarizer; and a second optical compensation layer placed so that a slow axis thereof intersects with the absorption axis of the polarizer in the stated order, wherein: the first optical compensation layer provides a substantially ½ retardation with respect to a wavelength of monochromatic light; the second optical compensation layer provides a substantially ¼ retardation with respect to a wavelength of monochromatic light; and the hardcoat layer contains urethane-acrylate, polyol (meth)acrylate, and (meth) acrylic polymer having an alkyl group containing at least two hydroxyl groups.

In one embodiment of the invention, the polyol(meth)acrylate contained in the hardcoat layer contains pentaerythritol triacrylate and pentaerythritol tetraacrylate.

In one embodiment of the invention, the hardcoat layer has a thickness of 15 μm to 50 μm.

In one embodiment of the invention, the first optical compensation layer contains a resin with an absolute value of a photoelastic coefficient of $2.0 \times 10^{-11}$ m$^2$/N or less and has a relationship of $nx_1 > ny_1 = nz_1$ and an in-plane retardation $Re_1$ of 200 to 300 nm.

In one embodiment of the invention, the second optical compensation layer contains a resin with an absolute value of a photoelastic coefficient of $2.0 \times 10^{-11}$ m$^2$/N or less and has a relationship of $nx_2 > ny_2 = nz_2$ and an in-plane retardation $Re_2$ of 90 to 160 nm.

In one embodiment of the invention, each of the first optical compensation layer and the second optical compensation layer includes a stretched film obtained by uniaxially stretching a polymer film containing a norbornene-based resin.

In one embodiment of the invention, the polarizer further includes a protective layer on at least one side thereof.

In one embodiment of the invention, the polarizer, the first optical compensation layer, and the second optical compensation layer are placed via a pressure-sensitive adhesive layer.

According to another aspect of the invention, a liquid crystal panel is provided. The liquid crystal panel includes the polarizing plate with an optical compensation layer and a liquid crystal cell.

In one embodiment of the invention, the liquid crystal cell employs a TN mode, an ECB mode, or a VA mode.

According to still another aspect of the invention, a liquid crystal display apparatus is provided. The liquid crystal display apparatus includes the liquid crystal panel.

According to still another aspect of the invention, an image display apparatus is provided. The image display apparatus includes the polarizing plate with an optical compensation layer.

EFFECTS OF THE INVENTION

As described above, by allowing a hardcoat layer to contain urethaneacrylate, polyol (meth)acrylate, and (meth) acrylic polymer having an alkyl group containing at least two hydroxyl groups, a polarizing plate with an optical compensation layer that does not require a cover plate, contributes to the reduction in thickness, and is excellent in abrasion resistance and moist heat resistance can be obtained. It is presumed that, due to the presence of those resins, the hardcoat layer has an excellent hardness, whereby cracks, curls, and the deterioration in shrinkage on curing and in flexibility are prevented. Thus, the hardcoat layer in the present invention has excellent abrasion resistance and heat moist resistance, so it can replace a cover plate made of glass or a thick plastic sheet. The hardcoat layer in the present invention (preferably having a thickness of 15 to 50 μm) is remarkably thinner than the above-mentioned glass (thickness: about 0.5 mm) used in a liquid crystal display apparatus and the like, so the hardcoat layer can greatly contribute to the reductions in thickness and weight in a liquid crystal display apparatus and the like.

Further, the absorption axis of the polarizer and the slow axes of the first optical compensation layer (substantially a λ/2 plate) and the second optical compensation layer (substantially a λ/4 plate) are placed so as to intersect with each other. Therefore, in a liquid crystal display apparatus, particularly of a TN mode, an ECB mode, or a VA mode, a polarizing plate with an optical compensation layer that has excellent viewing angle compensation, exhibits circularly polarized light in a wide band, and suppresses light leakage in a black display can be obtained. Further, each of a first optical compensation layer and a second optical compensation layer may have an absolute value of a photoelastic coefficient in a predetermined range, so it can suppress a change in a retardation value caused by shrinkage stress during heating, and hence, heat non-uniformity can be prevented satisfactorily.

DESCRIPTION OF SYMBOLS

Figure 1A:
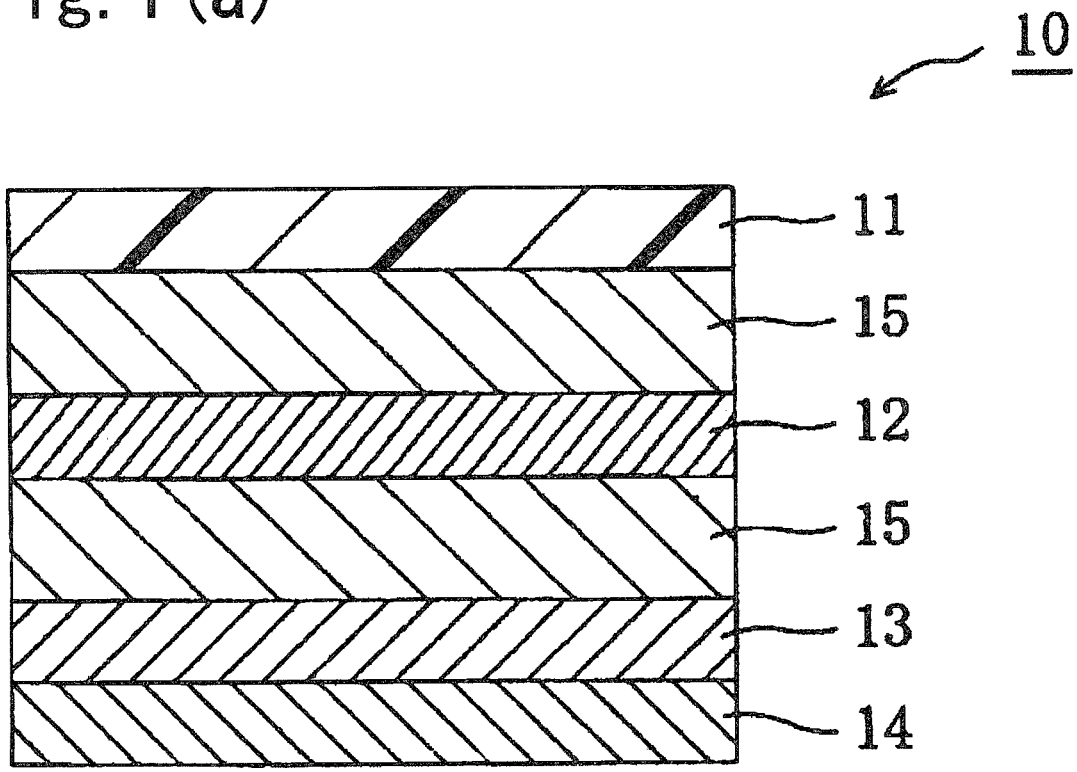
[FIG. 1] Parts (a) and (b) are schematic cross-sectional views of a polarizing plate with an optical compensation layer according to a preferred embodiment of the present invention.

10 polarizing plate with an optical compensation layer
11 hardcoat layer
12 polarizer
13 first optical compensation layer
14 second optical compensation layer
15 protective layer
16 third optical compensation layer
20 liquid crystal cell
100 liquid crystal panel

BEST MODE FOR CARRYING OUT THE INVENTION

Definitions of Terms and Symbols

Definitions of terms and symbols in the specification of the present invention are described below.

(1) Symbols "nx" indicates a refractive index in a direction providing a maximum in-plane refractive index (that is, a slow axis direction), symbol "ny" indicates a refractive index in a direction perpendicular to the slow axis in the plane (that is, a fast axis direction), and symbol "nz" indicates a refractive index in a thickness direction. Further, "ny=nz", for example, not only indicates a case where ny and nz are exactly equal but also indicates a case where ny and nz are substantially equal. In the specification of the present invention, the phrase "substantially equal" includes a case where ny and nz differ within a range providing no effects on overall polarizing characteristics of a polarizing plate with an optical compensation layer in practical use. Similarly, "nx=ny", not only indicates a case where nx and ny are exactly equal but also indicates a case where nx and ny are substantially equal.

(2) The term "in-plane retardation Re" indicates an in-plane retardation value of a film (layer) measured at 23° C. by using light of a wavelength of 590 nm. Re is obtained from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) Thickness direction retardation Rth indicates a thickness direction retardation value measured at 23° C. by using light of a wavelength of 590 nm. Rth is obtained from an equation Rth=(nx−nz)×d, where nx and nz represent refractive indices of a film (layer) at a wavelength of 590 nm in a slow axis direction and a thickness direction, respectively, and d (nm) represents a thickness of the film (layer).

(4) The subscripts "1", "2", and "3" attached to a term or symbol described in the specification of the present invention represent a first optical compensation layer, a second optical compensation layer, and a third optical compensation layer, respectively.

(5) The term "λ/2 plate" indicates a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). The λ/2 plate has an in-plane retardation value of a film (layer) of about ½ with respect to a predetermined light wavelength (generally, in a visible light region).

(6) The term "λ/4 plate" indicates a plate having a function of converting linearly polarized light of a specific wavelength into circularly polarized light (or converting circularly polarized light into linearly polarized light). The λ/4 plate has an in-plane retardation value of a film (layer) of about ¼ with respect to a predetermined light wavelength (generally, in a visible light region).

Figure 1B:
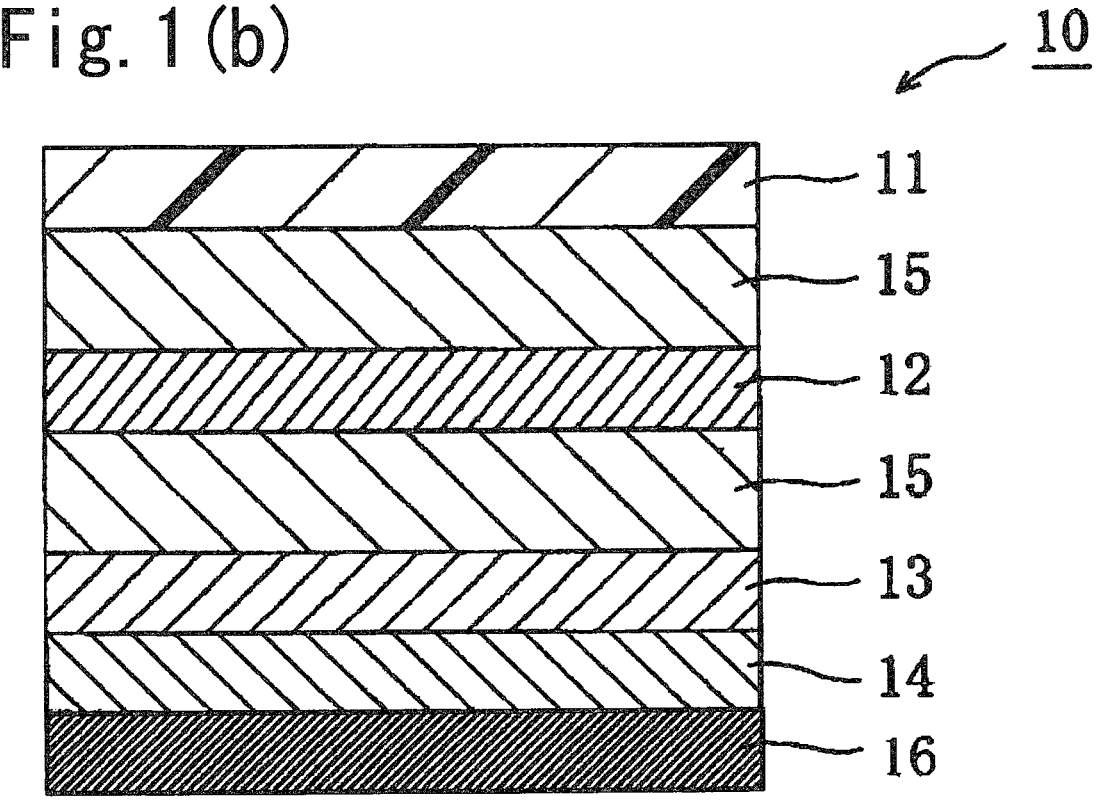

A. Entire Configuration of a Polarizing Plate with an Optical Compensation Layer FIG. 1(a) is a schematic cross-sectional view of a polarizing plate with an optical compensation layer according to a preferred embodiment of the present invention. As shown in FIG. 1(a), a polarizing plate with an optical compensation layer 10 includes a hardcoat layer 11, a polarizer 12, a first optical compensation layer 13, and a second optical compensation layer 14 in the stated order. The polarizer 12 and the first optical compensation layer 13, and the first optical compensation layer 13 and the second optical compensation layer 14 are laminated respectively via any suitable pressure-sensitive adhesive layer or adhesive layer (not shown). FIG. 1(b) is a schematic cross-sectional view of a polarizing plate with an optical compensation layer according to another preferred embodiment of the present invention. As shown in FIG. 1(b), the polarizing plate with an optical compensation layer 10 of the present invention can further include a third optical compensation layer 16 on a side of the second optical compensation layer 14, which is opposite to the first optical compensation layer 13, if required. Further, if required, any suitable protective layer 15 may be provided on at least one surface of the polarizer 12 (in FIG. 1, the protective layers 15 are provided on both surfaces of the polarizer 12). The entire thickness of the polarizing plate with an optical compensation layer of the present invention is preferably 280 to 520 μm, and more preferably 280 to 350 μm.

B. Hardcoat Layer

The hardcoat layer 11 contains urethaneacrylate (A), polyol(meth)acrylate (B), and a (meth)acrylic polymer (C) having an alkyl group containing at least two hydroxyl groups. Hereinafter, those materials (containing additives and the like, if required) may be referred to as hardcoat layer-forming materials. Due to the presence of those materials, the hardcoat layer has an excellent hardness, whereby cracks and curls in the hardcoat layer can be prevented. As a result, the hardcoat layer can have excellent abrasion resistance and moist heat resistance, so the hardcoat layer can replace a cover plate made of glass or the like. Further, the hardcoat layer is remarkably thinner than the cover plate made of glass or the like, so the hardcoat layer of the present invention contributes to the reduction in thickness of the polarizing plate with an optical compensation layer, and further greatly contributes to the reduction in thickness and weight of the entire liquid crystal display apparatus.

The thickness of the above hardcoat layer is appropriately set depending upon the purpose. The thickness is preferably 15 to 50 μm, more preferably 15 to 40 μm, still more preferably 15 to 30 μm, and particularly preferably 18 to 23 μm. The hardcoat layer can have a hardness of a certain degree or more (for example, 4H or more in terms of the pencil hardness) due to the thickness in those ranges, so the hardcoat layer can have excellent abrasion resistance. Further, the hardness of a certain degree or more can prevent cracks and curls in the hardcoat layer. Further, since the hardcoat layer is remarkably thinner (for example, ⅒ or less) than a cover plate made of glass or the like, the hardcoat layer can contribute to the reduction in thickness of the polarizing plate with an optical compensation layer.

The above pencil hardness is preferably 4H or more, and particularly preferably 5H or more. The pencil hardness is preferably 8H or less although the upper limit thereof is not limited. Because the pencil hardness is in those ranges, excellent abrasion resistance can be obtained.

The abrasion resistance of the above hardcoat layer is appropriately set depending upon the purpose. The abrasion resistance can be based on difference in a haze value of a hardcoat layer before and after an abrasion resistance test (descried later in detail) by conducting the abrasion resistance test, for example. The difference in a haze value is preferably 0 to 0.7, and more preferably 0 to 0.5. Due to difference in the haze value in those ranges, a practically excellent hardcoat layer that has excellent abrasion resistance, excellent transparency and the like can be obtained.

As the above urethaneacrylate (A), any suitable urethaneacrylate is adopted. Urethaneacrylate preferably contains (meth) acrylic acid and/or (meth)acrylate, polyol, and diisocyanate. For example, urethaneacrylate produced by preparing hydroxy(meth)acrylate having at least one hydroxyl group from (meth)acrylic acid and/or (meth)acrylate and polyol, and allowing hydroxy(meth)acrylate to react with diisocyanate is used. Those components may be used alone or in a combination. Further, various kinds of additives may be added depending upon the purpose. In this specification, (meth)acrylic acid refers to acrylic acid and/or methacylic acid, and the term "(meth)" has the meaning similar to the above. In the case of using acrylic acid and methacrylic acid together, the mixing ratio thereof is not particularly limited and appropriately set depending upon the purpose.

As the (meth)acrylate, any appropriate (meth)acrylates may be used. For example, alkyl (meth)acrylates such as methyl (meth)acrylate, ethyl (meth)acrylate, propyl (meth) acrylate, isopropyl (meth)acrylate, and butyl (meth)acrylate, and cycloalkyl (meth)acrylate such as cyclohexyl (meth) acrylate are mentioned.

The polyol is a compound having at least two hydroxyl groups. As the polyol, any appropriate polyols may be used. For example, ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decane glycol, 2,2,4-trimethyl-1,3-pentanediol, 3-methyl-1,5-pentanediol, neopentyl glycol hydroxy pivalate, cyclohexane dimethylol, 1,4-cyclohexanediol, spiroglycol, tricyclode cane methylol, hydrogenated bisphenol A, ethyleneoxide-added bisphenol A, propyleneoxide-added bisphenol A, trimethylol ethane, tridimethylol propane, glycerine, 3-methylpentane-1,3,5-triol, pentaerythritol, dipentaerythritol, tripentaerythritol, and glucoses are mentioned.

As the diisocyanate, any appropriate diisocyanates may be used. For example, each diisocyanate of aromatic, aliphatic, or alicyclic diisocyanates can be used. More specifically, tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethylhexamethylene diisocyanate, 4,4-diphenylmethane diisocyanate, and hydrogenated products thereof are mentioned.

The content of the urethaneacrylate (A) is appropriately set depending upon the purpose. The content of the urethaneacrylate is preferably 15 to 55 parts by weight, and more preferably 25 to 45 parts by weight with respect to 100 parts by weight of total resin components (total of resin components A to C and additive resin components) of the hardcoat layer-forming materials. When the adding amount of the urethaneacrylate is in the above range, the hardness and the flexibility are well balanced, and cracks and curls can be prevented in a hardcoat layer. Further, a hardcoat layer having adhesion with respect to the protective layer, the polarizer, or the like, and having desired abrasion resistance (hardness) can be obtained.

As the polyol (meth)acrylate (B), any appropriate polyol (meth)acrylates may be used. More specifically, pentaerythritol di(meth)acrylate, pentaerythritol tri(meth)acrylate, pentaerythritol tetra(meth)acrylate, dipentaerythritol hexa(meth)acrylate, and 1,6-hexanediol (meth)acrylate are mentioned. Those components are used alone or in combination. In addition, various additives may be added as required.

The polyol(meth)acrylate (B) preferably contains pentaerythrytol triacrylate and pentaerythrytol tetraacrylate. Pentaerythrytol triacrylate and pentaerythrytol tetraacrylate are contained in any suitable state. For example, the polyol (meth)acrylate (B) may be a copolymer or a mixture thereof. Further, the polymerization ratio, mixing ratio (content), etc. thereof are set appropriately depending upon the purpose. For example, in the case of using the polyol(meth)acrylate (B) as a mixture, the content of pentaerythriol triacrylate is preferably 10 to 40 parts by weight, more preferably 15 to 35 parts by weight, and particularly preferably 20 to 30 parts by weight with respect to 100 parts by weight of the urethaneacrylate (A). The content of pentaerythritol tetraacrylate is preferably 25 to 55 parts by weight, more preferably 30 to 50 parts by weight, and particularly preferably 35 to 45 parts by weight with respect to 100 parts by weight of the urethaneacrylate (A). Due to the contents in those ranges, a hardcoat layer having excellent hardness can be obtained.

The content of the polyol(meth)acrylate (B) is preferably 70 to 180 parts by weight, and more preferably 100 to 150 parts by weight with respect to 100 parts by weight of the urethaneacrylate (A). When the polyol(meth)acrylate (B) is contained in parts by weight in the above range with respect to the urethaneacrylate (A), the shrinkage on curing of the hardcoat layer is small, curls in the hardcoat layer can be prevented, and the degradation in flexibility of the hardcoat layer can be suppressed. Further, when the content of the polyol(meth)acrylate (B) is in the above range, abrasion resistance (i.e., the difference in a haze value) can be set in the above desired range (preferably 0 to 0.7, more preferably 0 to 0.5), so a practically excellent hardcoat layer that is excellent in a hardcoat property, i.e., a hardness and abrasion resistance, and is excellent in transparency can be obtained.

As the above (meth) acrylic polymer (C), the one having an alkyl group containing at least two hydroxyl groups is used. Specific examples thereof include a (meth) acrylic polymer having a 2,3-dihydroxypropyl group, and (meth)acrylic polymer having a 2-hydroxyethyl group and 2,3-dihydroxypropyl group.

The content of the above (meth) acrylic polymer (C) is preferably 25 to 110 parts by weight, and more preferably 45 to 85 parts by weight with respect to 100 parts by weight of the urethaneacrylate (A). When the content of the (meth) acrylic polymer is in the above range, an excellent applying property can be obtained, and curls in the hardcoat layer can be suppressed.

According to the present invention, due to containing the above (meth)acrylic polymer (C), the shrinkage on curing of the hardcoat layer is suppressed, and as a result, the occurrence of curls is prevented. In terms of the production of a hardcoat layer and the like, it is preferred that the occurrence of curls is suppressed within 30 mm. By suppressing the occurrence of curls within the range, workability and a production efficiency can be enhanced further.

The above hardcoat layer-forming materials may have inorganic fine particles and/or organic fine particles. The above inorganic fine particles are not particularly limited, and examples thereof include silicon oxide, titanium oxide, aluminum oxide, zinc oxide, tin oxide, calcium carbonate, barium sulfate, talc, kaolin, and calcium sulfate. The organic fine particles are not particularly limited, and examples thereof include polymethylmethacrylate acrylate resin powder, silicone-based resin powder, polystyrene resin powder, polycarbonate resin powder, acrylstyrene-based resin powder, benzoguanamine-based resin powder, melamine-based resin powder, polyolefin-based resin powder, polyester-based resin powder, polyamide resin powder, polyimide-based resin powder, and polyethylene fluoride resin powder. Fine particles that do not allow the hardcoat layer to shrink on curing are preferred.

The above fine particles adjust the apparent refractive index of the hardcoat layer depending upon the particle size, content, and the like, so they can suppress a phenomenon called an interference fringe in which reflected light of ambient light exhibits a rainbow hue. Recently, for example, three band fluorescent lamps, which have a strong emission intensity in a particular wavelength and are characterized by allowing an object to be recognized clearly, have increased greatly, and an interference fringe appearing remarkably during the use of the three band fluorescent lamps can be suppressed by using such fine particles. Further, even in the case where the refractive index changes between the hardcoat layer and the polarizer or the like adjacent thereto, the degradation in display quality can be suppressed by adjusting the apparent refractive index.

The shape of the above fine particles is not particularly limited, and may have a spherical shape such as a bead shape or an amorphous shape such as a powder shape. Those fine particles can be selected alone or in combination for use. The average particle size of the fine particles is set appropriately depending upon the purpose. The average particle size is preferably 1 to 30 µm, and more preferably 2 to 20 µm. Further, the ultra-fine particles and the like may be dispersed or impregnated in the fine particles, if required.

The content of the above fine particles is not particularly limited, and can be set appropriately depending upon the purpose and the particle size of the fine particles. For example, in the case of providing an antiglare effect, the content of the fine particles is preferably 2 to 60 parts by weight with respect to 100 parts by weight of the hardcoat layer-forming materials. Further, in the case of providing an antiblocking property, the content of the fine particles is preferably 1 to 50 parts by weight with respect to 100 parts by weight of the hardcoat layer-forming material.

The above ultra-fine particles have a function of adjusting the apparent refractive index of the hardcoat layer in the same way as in the above fine particles, as well as the function of providing electrical conductivity. The particle size of the ultra-fine particles is selected appropriately depending upon the purpose, and is preferably 100 nm or less. The lower limit of the ultra-fine particles is preferably 1 nm or more although not particularly limited. As the ultra-fine particles, any suitable ultra-fine particles are used. Preferably, the components (for example, a metal oxide) similar to those of the above fine particles are used. The ultra-fine particles may be used alone or in a combination with the above fine particles. The compounding ratio of the ultra-fine particles with the above fine particles or the like is set appropriately depending upon the purpose.

The above hardcoat layer-forming materials can preferably contain any suitable solvent. Due to the presence of the solvent in the hardcoat layer-forming materials, the applying property of the hardcoat layer-forming materials is enhanced. The concentration of the solvent can be selected appropriately depending upon the purpose. The content of the hardcoat layer-forming materials is preferably 40 to 60 parts by weight, and more preferably 45 to 55 parts by weight with respect to 100 parts by weight of the solvent. When the solvent is contained within those ranges, for example, applying nonuniformity and drying nonuniformity can be suppressed, and an excellent applying property can be obtained.

Specific examples of the solvent include methyl formate, ethyl formate, n-pentyl formate, butyl formate, methyl acetate, ethyl acetate, n-pentyl acetate, butyl acetate, isobutyl acetate, methyl propionate, ethyl propionate, dibutyl ether, dimethoxy methane, diethoxy ethane, propylene oxide, 1,4-dioxane, 1,3-dioxolane, 1,3,5-trioxane, tetra hydrofurane, acetone, methylethyl ketone, diethyl ketone, dipropyl ketone, diisobutyl ketone, cyclopentanone, cyclohexanone, methylcyclohexanone, acetylacetone, diaceton alcohol, methyl acetoacetate, ethyl acetoacetate, methanol, ethanol, 1-propanol, 2-propanol, 1-butanol, 2-butanol, 2-methyl-2-butanol, 1-pentanol, cyclohexanol, methylisobutyl ketone, 2-pentanone, 2-hexanone, 2-octanone, and 3-heptanone. Those solvents may be used alone or in a combination. Preferably, the solvent is ethyl acetate and/or butyl acetate. The content of those solvents is set appropriately depending upon the purpose. For example, in the case of using ethylacetate, the content of ethyl acetate is preferably 20 parts by weight or more, more preferably 25 parts by weight or more, and particularly preferably 30 to 70 parts by weight with respect to 100 parts by weight of the total solvent. When the solvent contains ethyl acetate in those ranges, applying nonuniformity and drying nonuniformity caused by the volatilization rate of the solvent can be suppressed. The mixing condition of the solvent and the hardcoat layer-forming materials is set appropriately depending upon the purpose. For example, the temperature is set appropriately depending upon the purpose, and is preferably room temperature.

The above hardcoat layer-forming material may contain any suitable leveling agent depending upon the purpose. The leveling agent is preferably a fluorine-based or silicone-based leveling agent, and more preferably a silicone-based leveling agent. Examples of the silicone-based leveling agent include reactive silicone, polydimethylsiloxane, polyether-denatured polydimethylsiloxane, and polymethylalkylsiloxane. The reactive silicone-based leveling agent and the siloxane-based leveling agent are particularly preferred. The use of the reactive silicone-based leveling agent imparts a sliding property to the surface, whereby excellent abrasion resistance is maintained. Further, the use of the siloxane-based leveling agent enhances the formability of the hardcoat layer.

As the reactive silicone-based leveling agent, any appropriate leveling agents may be used in accordance with purpose. For example, agents having a siloxane bond, acrylate group, and hydroxyl group are mentioned. Specific examples include:

(1) copolymer having a molar ratio of (dimethylsiloxane/methyl):(3-acryloyl-2-hydroxypropoxypropyl siloxane/methyl):(2-acryloyl-3-hydroxypropoxypropyl siloxane)=0.8:0.16:0.04;

(2) copolymer having a molar ratio of dimethylsiloxane:hydroxylpropylsiloxane:6-isocyanate hexyl isocyanurate:aliphatic polyester=6.3:1.0:2.2:1.0; and (3) copolymer having a molar ratio of dimethylsiloxane:m-ethylpolyethylene glycol propylether siloxane having an acrylate at the termial:methylpolyethylene glycol propylether siloxane having a hydroxyl group at the terminal=0.88:0.07:0.05. Note that the molar ratio of each component contained in those leveling agents may be set appropriately in accordance with purpose.

The compounding amount of the leveling agent is set appropriately depending upon the purpose. The compounding amount of the leveling agent is preferably 5 parts by weight or less, and more preferably 0.01 to 5 parts by weight with respect to 100 parts by weight of the total resin components of the hardcoat layer-forming materials.

When the above leveling agent is contained in the hardcoat layer-forming materials in the case of using UV-light as a curing means for the hardcoat layer-forming materials, the leveling agent is bred on an air interface during preliminary drying and solvent drying, and can prevent curing inhibition of a UV-curable resin, caused by oxygen. As a result, a hardcoat layer having a sufficient hardness even on the outermost surface can be obtained. Further, the silicone-based leveling agent can also enhance abrasion resistance since it provides a sliding property by being bred on the surface of the hardcoat layer.

The above hardcoat layer-forming materials may have various additives, if required, as long as the performance is not impaired. Examples of the additives include a pigment, a filler, a dispersant, a plasticizer, a UV-absorber, a surfactant, an antioxidant, and a thixotropy agent. Those additives may be used alone or in a combination.

The above hardcoat layer-forming materials may contain any appropriate polymerization initiators as required, preferably photopolymerization initiator. For example, 2,2-dimethoxy-2-phenylacetophenone, acetophenone, benzophenone, xanthone, 3-methylacetophenone, 4-chlorobenzophenone, 4,4'-dimethoxybenzophenone, benzoinpropyl ether, benzyldimethyl ketal, N,N,N',N'-tetramethyl-4,4'-diaminobenzophenone, 1-(4-isopropylphenyl)-2-hydroxy-2-methylpropane-1-one, and other thioxanthone-based compounds are mentioned.

As a method of forming the above hardcoat layer, any suitable method is adopted. Hereinafter, a typical formation example of the hardcoat layer will be described, but the forming method is not limited thereto. In order to form the hardcoat layer, the urethaneacrylate (A), the polyol(meth)acrylate (B), and the (meth)acrylpolymer (C) having an alkyl group containing at least two hydroxyl groups (so-called hardcoat layer-forming materials) are applied to any appropriate base material or the like, followed by curing. The hardcoat layer-forming materials may be applied as a solution dissolved in a solvent. In the case where the hardcoat layer-forming materials are applied as a solution, it is preferred to cure the materials after the solvent is dried.

As a method of applying the hardcoat layer-forming materials to a base material, any suitable method is adopted, and for example, applying methods such as fountain coating, die coating, spin coating, spray coating, gravure coating, roll coating, and bar coating can be used.

There is no particular limit to the curing means of the hardcoat layer-forming materials. The curing means is preferably ionizing radiation curing. For example, various kinds of active energies can be used, and UV-light is preferably used. Examples of an energy ray source include a high-pressure mercury lamp, a halogen lamp, a xenon lamp, a metal halide lamp, a nitrogen laser, an electron beam acceleration apparatus, and a radioactive element. The metal halide lamp is preferred. The irradiation amount of the energy ray source and the like are selected appropriately depending upon the purpose. Preferably, the irradiation amount is 50 to 5,000 mJ/cm$^2$ in terms of the accumulated exposure amount at a UV-light wavelength of 365 nm. When irradiation amount is within the range, curing can be performed sufficiently, and the hardcoat layer can have a desired hardness and excellent transparency. The hardcoat layer is formed through the above steps.

The above hardcoat layer may be subjected to various kinds of surface treatments, if required. The surface treatment can enhance the adhesiveness with respect to the base material, protective layer, polarizer, or the like. As the surface treatment, any suitable method can be adopted depending upon the purpose. Examples of the surface treatment include a low-pressure plasma treatment, a UV-light irradiation treatment, a corona treatment, a flame treatment, an acid or alkali treatment. Further, the above hardcoat layer may have an antiglare property, if required. As the method of imparting an antiglare property, any suitable method is adopted. For example, an antiglare property can be obtained by using the above fine particles.

The above hardcoat layer may have an antireflection layer on at least one side. When light strikes an object, the light repeats a phenomenon of reflection from an interface of the object, and absorption and scattering in the object, and then passes to a reverse surface of the object. One of the factors of decreasing the visibility of an image when the hardcoat layer is provided in an image display apparatus or the like is the reflection of light at an interface between the air and the hardcoat layer. The antireflection layer reduces the surface reflection. By suppressing light reflected at the surface of the hardcoat layer and the like, for example, a display in a reflection-type liquid crystal display apparatus becomes clearer. As the antireflection layer, any suitable antireflection layer is adopted. Further, the antireflection layer may be used as a single layer or as a laminate of at least two layers. The lamination method is selected appropriately depending upon the purpose. The antireflection layer may contain a silane-based compound containing a fluorine group and/or an organic compound containing a fluorine group, if required. The purpose is to prevent the contamination resulted from an outer environment.

The wavelength region of visible light that allows the above antireflection layer to express an antireflection function is 380 to 780 nm, and the wavelength region with a particularly high visibility is in a range of 450 to 650 nm. Generally, the antireflection layer is designed so that the reflectance at a mean wavelength of 550 nm is made minimum.

The thickness of the antireflection layer is set appropriately depending upon the purpose. For example, the thickness is 86 nm to 105 nm. The refractive index of the antireflection layer is, for example, 1.2 to 1.8, although it may vary depending upon the refractive index of a composition to be used and the like.

As the method of forming the antireflection layer, any suitable method is selected. For example, there is a method of applying any suitable material for forming an antireflection layer (herein after, referred to as "antireflection layer-forming material") to the hardcoat layer by a dry method or a wet method, followed by drying and curing. By using those methods, the thickness of the antireflection layer becomes uniform, and an excellent antireflection function can be obtained.

As the above antireflection layer-forming material, any suitable material is selected. Examples of the material include a resin-based material such as UV-curable acrylic resin, a hybrid material in which inorganic fine particles such as colloidal silica are dispersed in a resin, and a sol-gel material using metal alkoxide such as tetraethoxysilane and titanium tetraethoxide. Each material may use a fluorine group-containing compound for providing the surface with an anti-contamination property. The antireflection layer-forming material is preferably a material containing a large amount of inorganic components, and more preferably a sol-gel material. This is because such materials are excellent in abrasion resistance. The sol-gel material can be used by being condensed partially.

Further, an antireflection layer-forming material containing a siloxane oligomer with a number average molecular weight of 500 to 10,000 in terms of the ethylene glycol conversion and a fluorine compound having a fluoroalkyl structure and a polysiloxane structure with a number average molecular weight of 5,000 to 100,000 in terms of the polystyrene conversion, described in JP 2004-167827 A, may be used.

The above antireflection layer-forming material may have any suitable ultra-fine particles, if required. The structure of the ultra-fine particles is selected appropriately depending upon the purpose, and the ultra-fine particles are preferably hollow. Further, the shape of the ultra-fine particles is selected appropriately depending upon the purpose, and the ultra-fine particles are preferably in a spherical shape. The average particle size of the ultra-fine particles is selected appropriately depending upon the purpose, and is preferably about 5 to 300 nm. As the ultra-fine particles, any suitable material is selected depending upon the purpose, and silicon oxide is used preferably. If required, the ultra-fine particles may be treated with any suitable coupling agent, and any suitable inorganic sol may be added so as to enhance the film strength of the antireflection layer.

The above antireflection layer-forming material may have a dispersion of ultra-fine particles (for example, a dispersion of the above silicon oxide ultra-fine particles in a hollow and spherical shape) and any suitable matrix component. The matrix component refers to a component capable of forming a coating film on the surface of the hardcoat layer, and is selected for use appropriately from a resin and the like that satisfy the conditions such as the adhesion with respect to the hardcoat layer, a hardness, and an applying property. Further, a hydrolysable organic silicon compound or the like such as the above silicon oxide ultra-fine particles may be used as the matrix component.

The above antireflection layer-forming material is prepared by any suitable method. For example, the antireflection layer-forming material can be prepared by mixing a dispersion of the above ultra-fine particles with the above matrix component, and diluting the mixture with any suitable organic solvent, if required. For example, the weight ratio between the silicon oxide ultra-fine particles and the matrix component of the above antireflection layer-forming material is preferably in a range of the silicon oxide ultra-fine particles: matrix=1:99 to 9:1. This is because, by setting the weight ratio in such a range, the strength of the antireflection layer satisfies practicability, and the effect of adding the silicon oxide ultra-fine particles is likely to be expressed.

As the method of forming the antireflection layer from the antireflection layer-forming material, any suitable method is adopted. For example, there is a method of applying the above antireflection layer-forming material to the hardcoat layer, followed by drying and curing. The applying method can be selected appropriately depending upon the purpose.

The temperature for drying and curing the antireflection layer-forming materials and the like for forming the above antireflection layer is set appropriately depending upon the purpose. The temperature is preferably 60 to 150° C., and more preferably 70 to 130° C. Further, a drying and curing time is set appropriately depending upon the purpose. The drying and curing time is preferably 1 to 30 minutes, and more preferably about 1 to 10 minutes. This is because drying and curing are sufficient, and excellent productivity is obtained. A method of performing drying and curing is selected appropriately depending upon the purpose.

By subjecting the obtained antireflection layer to a heat treatment, the antireflection layer having a higher hardness is obtained. The temperature of the heat treatment is not particularly limited, and is preferably 40 to 130° C., and more preferably 50 to 100° C. The time of the heat treatment is set appropriately depending upon the purpose. The time of the heat treatment is preferably 1 minute to 100 hours. In order to further enhance abrasion resistance, the heat treatment is performed for 10 hours or longer. As heating, a method using a hot plate, an oven, a belt furnace, or the like is adopted appropriately.

The antireflection layer preferably has a laminate structure of a titanium oxide layer and a silicon oxide layer. As a result, the antireflection function can be expressed more greatly, and the reflection in a wavelength region (380 to 780 nm) of visible light can be further reduced uniformly.

The above hardcoat layer may have any suitable base material, if required. The base material is used, for example, in order to support a hardcoat layer-forming material to form a hardcoat layer, or to enhance the self-supporting property of the hardcoat layer. The base material is preferably a film that is excellent in light transmittance of visible light (preferably, a light transmittance of 90% or more) and transparency (preferably, a haze value of 1% or less), and has less optical birefringence. As the base material, any suitable base material is used depending upon the purpose. Examples of the base material include films made of transparent polymers, for example, a polyester-based polymer such as polyethyleneterephthalate and polyethylenenaphthalate, a cellulose-based polymer such as diacetyl cellulose and triacetyl cellulose, a polycarbonate-based polymer, and an acrylic polymer such as polymethylmethacrylate. The thickness of those films is set appropriately depending upon the purpose, and is preferably 10 to 500 μm, and more preferably 20 to 300 μm. A protective layer described later may also function as the base material.

The above base material may be treated appropriately depending upon the purpose. For example, the reverse surface (surface on an opposite side of the hardcoat layer formation surface) of the base material may be subjected to a treatment for preventing the occurrence of curls in the hardcoat layer. As this treatment, any suitable treatment is adopted, and an example thereof is a solvent treatment. This treatment cancels the force of the hardcoat layer for being curled on the opposite side of the base material surface, by providing the base material with the property of being curled on the reverse surface side. Consequently, the occurrence of curls in the entire hardcoat layer can be prevented. A specific treatment method is performed by applying a composition containing a solvent capable of dissolving the base material or a solvent capable of swelling the base material by any suitable method. For example, the composition is applied to the reverse surface of the base material to be a wet film thickness (film thickness before being dried) of preferably 1 to 100 μm and more preferably 5 to 30 μm, with a gravure coater, a dip coater, a reverse coater, an extrusion coater, or the like.

As the above solvent, any suitable solvent is used depending upon the purpose. Examples of the solvent include benzene, toluene, xylene, dioxane, acetone, methyl ethyl ketone, N,N-dimethylformamide, methyl acetate, ethyl acetate, trichloroethylene, methylene chloride, ethylene chloride, tetrachloroethane, trichloroethane, and chloroform. Examples of the solvent that does not dissolve the base material include methanol, ethanol, n-propyl alcohol, i-propyl alcohol, and n-butanol. Those solvents may be used alone or in a combination. The mixing ratio (weight ratio) of the solvents is set appropriately depending upon the purpose. For example, in the case of mixing the solvent capable of dissolving the base material and/or solvent capable of swelling the base material (A) with the solvent that does not dissolve the base material (B), the mixing ratio there between is preferably (A):(B)=10:0 to 1:9.

A transparent resin layer may be provided on the reverse surface (the surface on an opposite side of the hardcoat layer formation surface) of the base material for the same purpose as that of the above solvent treatment. As the above transparent resin layer, any suitable resin layer is adopted depending upon the purpose. Examples of the transparent resin layer include those which contain a thermoplastic resin, a radiation-curable resin, a thermosetting resin, and other reactive resins as a main component. The layer containing a thermoplastic resin as a main component is preferred. A cellulose-based resin layer using diacetyl cellulose or the like is more preferred.

C. Polarizer

Any suitable polarizers may be employed as the above polarizer 12 depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dehydrochlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

D. Protective Layer

As shown in FIG. 1, any suitable protective layer 15 may be provided on at least one surface of the above polarizer 12, if required (In FIG. 1, the protective layers 15 are provided on both surfaces of the polarizer 12). The protective layer may be a single layer or include at least two layers. As the protective layer, any suitable protective layer is used depending upon the purpose. For example, any suitable film that can be used as the protective layer of the polarizer can be adopted. Further, if required, the protective layer may be subjected to a treatment capable of preventing curls in the hardcoat layer.

Specific examples of a material to be included as a main component of the film include: a cellulose-based resin such as triacetyl cellulose (TAC); and a transparent resin such as a polyester-based resin, a polyvinyl alcohol-based resin, a polycarbonate-based resin, a polyamide-based resin, a polyimide-based resin, a polyethersulfone-based resin, a polysulfone-based resin, a polystyrene-based resin, a polynorbornene-based resin, a polyolefin-based resin, an acrylic resin, and an acetate-based resin. Other examples thereof include: a thermosetting resin and a UV-curable resin such as an acrylic resin, an urethane-based resin, an acrylurethane-based resin, an epoxy-based resin, and a silicone-based resin. Still another example thereof is a glassy polymer such as a siloxane-based polymer. Further, a polymer film described in JP 2001-343529 A (WO 01/37007) may also be used. A material for the film may employ a resin composition containing a thermoplastic resin having a substituted or unsubstituted imide group on a side chain, and a thermoplastic resin having a substituted or unsubstituted phenyl group and nitrile group on a side chain, for example. A specific example thereof is a resin composition containing an alternating isobutene/N-methylmaleimide copolymer and an acrylonitrile/styrene copolymer. The polymer film may be an extrusion molded product of the resin composition described above, for example. TAC, a polyimide-based resin, a polyvinyl alcohol-based resin, and a glassy polymer are preferred. TAC is more preferred.

A method of laminating the above protective layer on a polarizer is selected appropriately depending upon the purpose. For example, a pressure-sensitive adhesive layer may be used, or an adhesive layer may be used. As described later, as the pressure-sensitive adhesive layer, any suitable pressure-sensitive adhesive is used depending upon the purpose. Any suitable adhesive is used for the adhesive layer depending upon the purpose. Specific examples of the adhesive layer include those which contain, as a base polymer, an acrylic polymer, a silicone-based polymer, polyester, polyvinyl alcohol, polyurethane, polyamide, polyvinylether, a vinyl acetate/vinyl chloride copolymer, denatured polyolefin, a rubber-based polymer such as an epoxy-based rubber, a fluorine-based rubber, a natural rubber and a synthetic rubber, or the like.

It is preferred that the above protective layer is transparent and color less. Specifically, the thickness direction retardation value is preferably −90 nm to +90 nm, more preferably −80 nm to +80 nm, and most preferably −70 nm to +70 nm.

Any appropriate thickness can be adopted as the thickness of the above film, as long as the above-mentioned preferable thickness direction retardation is obtained. Specifically, the thickness of the protective layer is preferably 5 mm or less, more preferably 1 to 500 μm, still more preferably 20 to 300 μm, and particularly preferably 30 to 150 μm.

The protective layer provided between polarizer 12 and the hardcoat layer 11 can be subjected to hardcoat treatment, antireflection treatment, anti-sticking treatment, antiglare treatment, and the like, if required. More specifically, in the case of using a (TAC) film for the protective layer, an alkali saponification treatment is preferably used as a surface treatment. The surface treatment is preferably performed in a cycle in which the surface of a (TAC) film is soaked in an alkaline solution, and thereafter, washed with water, followed drying. Examples of the alkaline solution include a potassium hydroxide solution and a sodium hydroxide solution, and the normal concentration of hydroxide ions is preferably 0.1 N to 3.0 N, and more preferably 0.5 N to 2.0 N. The temperature of the alkaline solution is preferably in a range of 25° C. to 90° C., and more preferably in a range of 40° C. to 70° C. After that, a water washing treatment and a drying treatment are conducted, whereby surface-treated triacetyl cellulose can be obtained.

The protective layer may have the same role as that of the base material for the above hardcoat layer. In this case, the base material can be omitted, so a polarizing plate with an optical compensation layer that is excellent in transmittance of visible light and transparency, and that has less optical birefringence can be obtained. Further, this case can contribute to the reduction in thickness of the polarizing plate with an optical compensation layer, and can omit the number of production steps, which can enhance a production efficiency.

E. First Optical Compensation Layer

Figure 2:
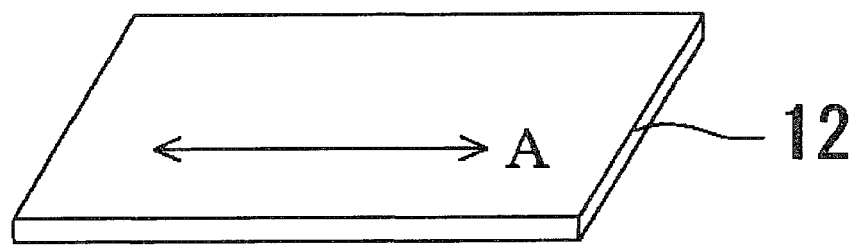
[FIG. 2] An exploded perspective view of the polarizing plate with an optical compensation layer according to a preferred embodiment of the present invention.
Figure 2:
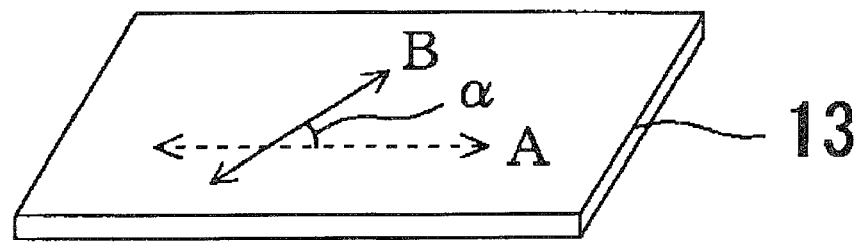
Figure 2:
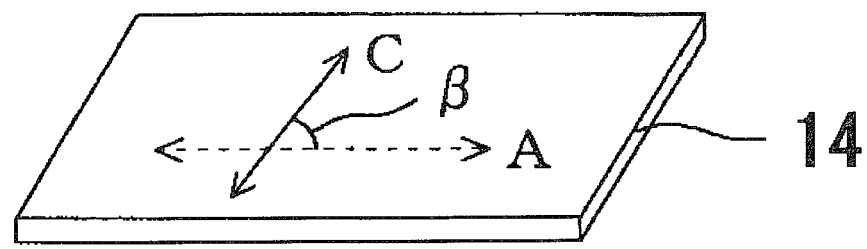

The above first optical compensation layer 13 is placed so that a slow axis B thereof intersects with an absorption axis A of the polarizer 12 (specifically, an angle α is defined) as shown in FIG. 2. The angle α is preferably 10° to 30°, more preferably 12° to 27', and still more preferably 14° to 25° in a counterclockwise direction with respect to the absorption axis A of the polarizer 12.

The above first optical compensation layer 13 can function as a λ/2 plate. The first optical compensation layer functions as a λ/2 plate, whereby a retardation can be adjusted appropriately regarding wavelength dispersion characteristics (in particular, the wavelength range in which a retardation departs from λ/4) of the second optical compensation layer that functions as a λ/4 plate. An in-plane retardation $Re_1$ of the first optical compensation layer is preferably 200 to 300 nm, more preferably 220 to 280 nm, and still more preferably 230 to 270 nm. Further, the above first optical compensation layer 13 has a refractive index profile of $nx_1 > ny_1 = nz_1$. Further, a thickness direction retardation $Rth_1$ is preferably 200 to 300 nm, more preferably 220 to 280 nm, and still more preferably 230 to 270 nm.

The thickness of the above first optical compensation layer can be set so as to function as a λ/2 plate most suitably. In other words, the thickness can be set so that a desired in-plane retardation is obtained. Specifically, the thickness is preferably 30 to 70 μm, more preferably 30 to 60 μm, and particularly preferably 30 to 50 μm.

The above first optical compensation layer 13 can contain a resin whose absolute value of a photoelastic coefficient is preferably $2.0\times10^{-11}$ m²/N or less, more preferably $2.0\times10^{-13}$ to $1.0\times10^{-11}$, and still more preferably $1.0\times10^{-12}$ to $1.0\times10^{-11}$. If the absolute value of the photoelastic coefficient is in such a range, a change in retardation is unlikely to occur in the case where the shrinkage stress during heating occurs. Thus, a first optical compensation layer is formed by using a resin with such an absolute value of a photoelastic coefficient, whereby heat nonuniformity of an image display apparatus to be obtained can be prevented preferably.

Typical examples of the resin capable of satisfying such a photoelastic coefficient include a cyclic olefin-based resin and a cellulose-based resin. The cyclic olefin-based resin is particularly preferred. The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6,7,8,8a-octahydronaphtalene, 6-ethyl-1,4:5,8-dimethano-1,4,4a,5,6,7,8,8a-octahydronaphtalene, 6-ethylidene-1,4:5,8-dimethano-1,4,4a,5,6,7,8,8a-octahydronaphtalene, 6-chloro-1,4:5,8-dimethano-1,4,4a,5,6,7,8,8a-octahydronaphtalene, 6-cyano-1,4:5,8-dimethano-1,4,4a,5,6,7,8,8a-octahydronaphtalene, 6-pyridyl-1,4:5,8-dimethano-1,4,4a,5,6,7,8,8a-octahydronaphtalene, and 6-methoxycarbonyl-1,4:5,8-dimethano-1,4,4a,5,6,7,8,8a-octahydronaphtalene; and a trimer of cyclopentadiene and a tetramer of cyclopentadiene, for example, 4,9:5,8-dimethano-3a,4,4a,5,8,8a,9,9a-octa hydro-1H-benzoindene and 4, 11:5, 10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin (for example, norbornene-based resin), various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

Any appropriate cellulose-based resin (typically an ester of cellulose and acid) may be employed as the cellulose-based resin. An ester of cellulose and fatty acid is preferred. Specific examples of such cellulose-based resin include cellulose triacetate (triacetylcellulose: TAC), cellulose diacetate, cellulose tripropionate, and cellulose dipropionate. Cellulose triacetate (triacetyl cellulose: TAC) is particularly preferred because it has low birefringence and high transmittance. In addition, many products of TAC are commercially available, and thus TAC has advantages of availability and cost.

Specific examples of commercially available products of TAC include the trade names "UV-50", "UV-80", "SH-50", "SH-80", "TD-80U", "TD-TAC", and "UZ-TAC" each manufactured by Fuji Photo Film CO., LTD., the trade name "KC series" manufactured by Konica Minolta Corporation, and the trade name "Triacetyl Cellulose 80 μm series" manufactured by Lonza Japan Corporation. Of those, "TD-80U" is preferred because of excellent transmittance and durability. In particular, "TD-80U" has excellent adaptability to a TFT-type liquid crystal display apparatus.

The first optical compensation layer 13 is obtained by stretching a film formed of the cyclic olefin-based resin or the cellulose-based resin. Any appropriate forming method may be employed as a method of forming a film from the cyclic olefin-based resin or the cellulose-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin and the cellulose-based resin are commercially available, and the commercially available films may be subjected to the stretching treatment.

The stretching ratio of the above film can vary depending upon the in-plane retardation value and thickness desired in the first optical compensation layer, the kind of a resin to be used, the thickness of a film to be used, the stretching temperature, and the like. Specifically, the stretching ratio is preferably 1.1 to 3.0 times, more preferably 1.2 to 2.5 times, and particularly preferably 1.3 to 2.4 times. By stretching a film with such a ratio, a first optical compensation layer having an in-plane retardation capable of exhibiting the effect of the present invention appropriately can be obtained.

The stretching temperature of the above film can vary depending upon the in-plane retardation value and thickness desired in the first optical compensation layer, the kind of a resin to be used, the thickness of a film to be used, the stretching ratio, and the like. Specifically, the stretching temperature is preferably 130 to 150° C., more preferably 135 to 145° C., and most preferably 137 to 143° C. By stretching a film at such a temperature, a first optical compensation layer having an in-plane retardation capable of exhibiting the effect of the present invention appropriately can be obtained.

Referring to FIGS. 1(a) and 1(b), the first optical compensation layer 13 is placed between the polarizer 12 (or the protective layer 15) and the second optical compensation layer 14. As a method of placing the first optical compensation layer, any suitable method can be adopted depending upon the purpose. Typically, pressure-sensitive adhesive layers (not shown) are provided on both sides of the above first optical compensation layer 13, and the polarizer 12 (the protective layer 15 in the case of FIG. 1) and the second optical compensation layer 14 are attached thereto. By filling the gap between the respective layers with the pressure-sensitive adhesive layers as such, whereby the relationship between optical axes of the respective layers can be prevented from being shifted and the respective layers can be prevented from rubbing against each other to damage with each other, when the layers are incorporated in an image display apparatus. Further, interface reflection between the layers can be reduced, and a contrast can also be enhanced when the layers are used in an image display apparatus. Pressure-sensitive adhesive layers to be used may be the same or different from each other.

The thickness of the above pressure-sensitive adhesive layer can be set appropriately depending upon the use and the adhesive strength. Specifically, the thickness of the pressure-sensitive adhesive layer is preferably 1 μm to 500 μm, more preferably 5 μm to 200 μm, and most preferably 10 μm to 100 μm.

As the pressure-sensitive adhesive forming the above pressure-sensitive adhesive layer, any suitable pressure-sensitive adhesive can be adopted. Specific examples include a solvent-type pressures-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is used preferably. This is because the solvent-type pressure-sensitive adhesive exhibits appropriate adhesive properties (wettability, cohesion, and adhesiveness) with respect to the polarizer and the first optical compensation layer, and is excellent in optical transparency, weather resistance, and heat resistance. Further, the pressure-sensitive adhesive may contain an appropriate additive depending upon the purpose. Examples of the additive include natural and synthetic resins, a tackfier resin, a filler such as glass fibers, glass beads, metal powder, and inorganic powder, a colorant, an antioxidant, and fine particles having an optical diffusion property.

The pressure-sensitive adhesive layer is formed by any suitable method. For example, any suitable solvent such as toluene and ethyl acetate are used alone or mixed to produce a solvent. Examples of the method include a method of dissolving or dispersing a base polymer or a composition thereof in the solvent to prepare about 10 to 40 parts by weight of a pressure-sensitive adhesive solution, and flow-casting or applying the solution to the first optical compensation layer or the like, thereby forming the pressure-sensitive adhesive layer directly on the first optical compensation layer and a method of transferring the pressure-sensitive adhesive layer onto the first optical compensation layer.

F. Second Optical Compensation Layer

The above second optical compensation layer 14 is placed so that a slow axis C thereof intersects with the absorption axis A of the polarizer 12 (specifically, an angle β is defined) as shown in FIG. 2. The angle β is preferably 65 to 95°, more preferably 70 to 93°, and still more preferably 72 to 92° in a counterclockwise direction with respect to the absorption axis A of the polarizer 12.

The above second optical compensation layer 14 can function as a λ/4 plate. According to the present invention, by correcting the wavelength dispersion characteristics of the second optical compensation layer that functions as a λ/4 plate with the optical properties of the first optical compensation layer that functions as a λ/2 plate, a circular polarization function can be exhibited in a wide wavelength range. In one embodiment, the above second optical compensation layer 14 can be a so-called positive A plate that has a refractive index profile of $nx_2 > ny_2 = nz_2$. In another embodiment, the above second optical compensation layer 14 can be a biaxial retardation film that has a refractive index profile of $nx_2 > ny_2 > nz_2$. By using as the second optical compensation layer 14 a biaxial retardation film that functions as a λ/4 plate and has a refractive index profile of $nx_2 > ny_2 > nz_2$, the function of the λ/4 plate that is a uniaxial retardation film and the function of a so-called negative C plate having a refractive index profile of $nx = ny > nz$ can be provided in one layer. Consequently, this can greatly contribute to the reduction in thickness of the entire polarizing plate with an optical compensation layer, while compensating for the birefringence of a liquid crystal layer in a liquid crystal cell of a VA mode effectively.

F-1. Second Optical Compensation Layer that is a Positive A Plate

An in-plane retardation $Re_2$ of the second optical compensation layer that is a positive A plate is preferably 90 to 160 nm, more preferably 100 to 150 nm, and still more preferably 110 to 140 nm. Further, a thickness direction retardation $Rth_2$ is preferably 90 to 160 nm, more preferably 100 to 150 nm, and still more preferably 110 to 140 nm.

The thickness of the above second optical compensation layer can be set so as to function most appropriately as a λ/4 plate. In other words, the thickness can be set so that a desired in-plane retardation is obtained. Specifically, the thickness is preferably 20 to 60 μm, more preferably 30 to 50 μm, and particularly preferably 30 to 45 μm.

The above second optical compensation layer can contain a resin whose absolute value of a photoelastic coefficient is preferably $2.0 \times 10^{-11}$ m²/N or less, more preferably $2.0 \times 10^{-13}$ to $1.0 \times 10^{-11}$, and still more preferably $1.0 \times 10^{-12}$ to $1.0 \times 10^{-11}$. When the absolute value of a photoelastic coefficient is in such a range, in the case where the shrinkage stress during heating occurs, a change in retardation is unlikely to occur. Thus, by forming a second optical compensation layer using a resin with such an absolute value of a photoelastic coefficient, heat nonuniformity of an image display apparatus to be obtained can be prevented satisfactorily also in combination with the effect of the first optical compensation layer.

Typical examples of resins capable of satisfying the photoelastic coefficient as described above include an cyclic olefin-based resin and a cellulose-based resin. The detail of the cyclic olefin-based resin and the cellulose-based resin is as described above.

An in-plane retardation $Re_2$ of the second optical compensation layer 14 can be controlled by changing the stretching ratio and the stretching temperature of the above cyclic olefin-based resin film and cellulose-based resin film. The stretching ratio can vary depending upon the in-plane retardation value and thickness desired in the second optical compensation layer, the kind of a resin to be used, the thickness of a film to be used, the stretching temperature, and the like. Specifically, the stretching ratio is preferably 1.05 to 2.05 times, more preferably 1.05 to 2 times, and most preferably 1.2 to 1.7 times. By stretching a film with such a ratio, a second optical compensation layer having an in-plane retardation capable of exhibiting the effect of the present invention appropriately can be obtained.

The stretching temperature can vary depending upon the in-plane retardation value and thickness desired in the second optical compensation layer, the kind of a resin to be used, the thickness of a film to be used, the stretching ratio, and the like. Specifically, the stretching temperature is preferably 130 to 150° C., more preferably 135 to 145° C., and most preferably 137 to 143° C. By stretching a film at such a temperature, a second optical compensation layer having an in-plane retardation capable of exhibiting the effect of the present invention appropriately can be obtained.

F-2. Second Optical Compensation Layer that is a Biaxial Retardation Film

An in-plane retardation $Re_2$ of the second optical compensation layer that is a biaxial retardation film is preferably 90 to 160 nm, more preferably 100 to 150 nm, and still more preferably 110 to 140 nm. Further, a thickness direction retardation $Rth_2$ is preferably 100 to 300 nm, more preferably 120 to 280 nm, and still more preferably 140 to 260 nm.

A Nz coefficient of the above second optical compensation layer is preferably 1.2 to 1.9, more preferably 1.3 to 1.9, still more preferably 1.4 to 1.8, and particularly preferably 1.4 to 1.7. In the case where the Nz coefficient is in the above ranges, viewing angle properties can be enhanced. The Nz coefficient is obtained by the following Expression (1).

$$Nz=(nx-nz)/(nx-ny) \quad (1)$$

The above second optical compensation layer can contain a resin whose absolute value of a photoelastic coefficient is preferably $2.0 \times 10^{-11}$ m$^2$/N or less, more preferably $2.0 \times 10^{-13}$ to $1.0 \times 10^{-11}$, and still more preferably $1.0 \times 10^{-12}$ to $1.0 \times 10^{-11}$. When the absolute value of a photoelastic coefficient is in such a range, in the case where the shrinkage stress during heating occurs, a change in retardation is unlikely to occur. Thus, by forming a second optical compensation layer using a resin with such an absolute value of a photoelastic coefficient, heat nonuniformity of an image display apparatus to be obtained can be prevented satisfactorily also in combination with the effect of the first optical compensation layer.

As the material forming the above second optical compensation layer, the same material as that forming the second optical compensation layer that is a positive A plate descried in the item F-1 can be used.

The in-plane retardation and the thickness direction retardation of the above second optical compensation layer can be controlled by changing the stretching ratio and the stretching temperature of a film formed of the above material. The stretching ratio and the stretching temperature can vary depending upon the in-plane retardation value, thickness direction retardation, and thickness desired in the second optical compensation layer, the kind of a resin to be used, the thickness of a film to be used, and the like.

As the stretching method, a fixed-end biaxial stretching method or a sequential biaxial stretching method can be preferably adopted. In one embodiment of the fixed-end biaxial stretching, stretching can be performed at a stretching temperature of preferably 135 to 165° C., more preferably 140 to 160° C., and at a stretching ratio of preferably 2.8 to 3.2 times, more preferably 2.9 to 3.1 times. In one embodiment of the sequential biaxial stretching, transverse stretching can be performed at a stretching ratio of, for example, 1.17 to 1.57 times, preferably 1.22 to 1.52 times, and still more preferably 1.27 to 1.5 times, and then, longitudinal stretching can be performed so as to cancel the shrinkage caused by the transverse stretching, at a stretching temperature of preferably 130 to 150° C., more preferably 135 to 145° C., and still more preferably 137 to 143° C. According to such stretching methods, a second optical compensation layer having an in-plane retardation and a thickness direction retardation capable of exhibiting the effect of the present invention appropriately can be obtained.

Referring to FIG. 1, the second optical compensation layer 14 is placed on a side of the first optical compensation layer 13, which is opposite to the polarizer 12. As the method of placing the second optical compensation layer, any suitable method can be adopted depending upon the purpose. Typically, a pressure-sensitive adhesive layer (not shown) is provided on the first optical compensation layer 13 side of the above second optical compensation layer 14, and the first optical compensation layer 13 is attached thereto. The detail of the pressure-sensitive adhesive layer is as described above. The polarizing plate with an optical compensation layer of the present invention can further include a third optical compensation layer having a refractive index profile of $nx_3=ny_3>nz_3$ on a side of the second optical compensation layer, which is opposite to the first optical compensation layer, for example, in the case where the second optical compensation layer is a λ/4 plate having a refractive index profile of $nx_2>ny_2=nz_2$. The third optical compensation layer is as described later.

G. Third Optical Compensation Layer

The third optical compensation layer is a so-called negative C plate having a refractive index profile of $nx_3=ny_3>nz_3$. When the third optical compensation layer has such a refractive index profile, in particular, the birefringence of a liquid crystal layer in a liquid crystal cell of a VA mode can be compensated satisfactorily in combination with the effect of the second optical compensation layer that has a refractive index profile of $nx_2>ny_2=nz_2$ and functions as a λ/4 plate.

As described above, as used herein, "nx=ny" includes the case where nx and ny are substantially equal to each other, as well as the case where nx and ny are strictly equal to each other. Therefore, the third optical compensation layer can have an in-plane retardation and a slow axis. An in-plane retardation $Re_3$ that is practically allowable as a negative C plate is preferably 0 to 20 nm, more preferably 0 to 10 nm, and still more preferably 0 to 5 nm.

The above third optical compensation layer can be formed of any suitable material as long as the above properties can be obtained. One specific example of the third optical compensation layer is a cholesteric alignment solidified layer. The "cholesteric alignment solidified layer" refers to a layer in which constituent molecules of the layer form a helical structure, a helical axis thereof is aligned substantially perpendicular to a plane direction, and an alignment state thereof is fixed. Thus, the "cholesteric alignment solidified layer" includes the case where a non-liquid crystal compound forms a pseudo structure like a cholesteric liquid crystal phase, as well as the case where a liquid crystal compound (preferably, nematic liquid crystal compound) exhibits a cholesteric liquid crystal phase. For example, the cholesteric alignment solidified layer can be formed by twisting a liquid crystal material under the condition of exhibiting a liquid crystal phase with a chiral agent to align the liquid crystal material in a cholesteric structure (helical structure), and subjecting the liquid crystal material to polymerization or cross-linking under such a state, thereby fixing the alignment (cholesteric structure) of the liquid crystal material.

A specific example of the cholesteric alignment solidified layer includes a cholesteric alignment solidified layer described in JP 2003-287623 A.

A thickness direction retardation $Rth_3$ of the cholesteric alignment solidified layer is preferably 90 to 270 nm, and more preferably 110 to 250 nm.

The thickness of the cholesteric alignment solidified layer can be set to be any suitable value as long as the above desired optical properties are obtained. In the case where the above third optical compensation layer is a cholesteric alignment solidified layer, the thickness thereof is preferably 1 to 5 μm, and more preferably 1.8 to 4.1 μm. As described later, the cholesteric alignment solidified layer can be attached to the second optical compensation layer via an adhesive layer (thickness: 2 to 6 μm), so it can greatly contribute to the reduction in thickness of a polarizing plate with an optical compensation layer.

Other specific examples of the above third optical compensation layer include a film formed of a non-liquid crystal material. The non-liquid crystal material is preferably a non-liquid crystal polymer. Such a non-liquid crystal material differs from a liquid crystalline material and may form a film having optical uniaxial property of nx=ny>nz due to its property regardless of alignment property of a substrate. Preferred examples of the non-liquid crystal material include polymers such as polyamide, polyimide, polyester, polyetherketone, polyamideimide, and polyesterimide because those polymers have excellent heat resistance, chemical resistance, and transparency, and high rigidity. One kind of polymer may be used alone, or the polymers may be used as a mixture of two or more kinds of polymers having different functional groups such as a mixture of polyarylether ketone and polyamide, for example. Of those polymers, polyimide is particularly preferred because of high transparency, high alignment property, and high stretching property.

A specific example of the above polyimide and a specific example of a method of forming the third optical compensation layer include a polymer and a method of producing an optical compensation film described in JP 2006-98849 A.

In the case where the third optical compensation layer is a film formed of the above non-liquid crystal material, a thickness direction retardation $Rth_3$ thereof is preferably 220 to 320 nm, and more preferably 240 to 300 nm.

In the case where the third optical compensation layer is a film formed of the above non-liquid crystal material, a thickness thereof is preferably 1 to 10 μm, and more preferably 2 to 4 μm.

Still another specific example of the above third optical compensation layer includes a polymer film containing a norbornene-based resin or the like. As the polymer film containing a norbornene-based resin, a polymer film formed of a norbornene-based resin (for example, "ZEONEX" (trade name) and "ZEONOR" (trade name) manufactured by Zeon Corporation) described in the above item E or the like can be used. By subjecting such a polymer film to, for example, biaxial stretching, a third optical compensation layer having desired optical properties can be obtained.

In the case where the third optical compensation layer is a polymer film containing a norbornene-based resin, a thickness direction retardation $Rth_3$ thereof is preferably 160 to 290 nm and more preferably 180 to 270 nm.

In the case where the third optical compensation layer is a polymer film containing a norbornene-based resin, a thickness thereof is preferably 10 to 80 μm, and more preferably 20 to 50 μm.

By subjecting the above polymer film to, for example, sequential biaxial stretching, a third optical compensation layer having an in-plane retardation and a thickness direction retardation capable of exhibiting the effect of the present invention appropriately can be obtained. In one embodiment of sequential biaxial stretching, longitudinal stretching can be performed at a stretching ratio of preferably 1.17 to 1.37 times, more preferably 1.22 to 1.32 times, and then, transverse stretching can be performed at a stretching ratio of preferably 1.27 to 1.47 times, more preferably 1.32 to 1.42 times, at a stretching temperature of preferably 155 to 195° C., more preferably 165 to 185° C.

Still another specific example of the above third optical compensation layer includes a laminate having the above cholesteric alignment solidified layer and a polymer film layer containing a cellulose-based resin such as triacetyl cellulose (TAC). As the polymer film layer containing a cellulose-based resin, the polymer film (for example, "TD-80U" (trade name) manufactured by FUJIFILM Corporation) described in the above item E or the like can be used.

In the case where the third optical compensation layer is the above laminate, a thickness direction retardation $Rth_3$ is preferably 120 to 320 nm, and more preferably 140 to 300 nm.

In the case where the third optical compensation layer is the above laminate, a thickness thereof is preferably 15 to 80 μm, and more preferably 35 to 60 μm.

As the method of laminating the cholesteric alignment solidified layer and the polymer film layer, any suitable method can be adopted. Specifically, for example, a liquid crystal composition containing a liquid crystal material and a chiral agent is applied to a polymer film, the liquid crystal material is aligned in a cholesteric structure on the film, and the alignment thereof is fixed, whereby a laminate can be formed. Further, for example, there are a method of transferring the above cholesteric alignment solidified layer onto a polymer film layer, and a method of attaching a cholesteric alignment solidified layer formed previously on a base material to a polymer film layer via an adhesive layer (typically, an isocyanate-based adhesive layer). The thickness of the adhesive layer is preferably 1 to 10 μm, and more preferably 2 to 6 μm.

Referring to FIG. 1(b), the third optical compensation layer 16 is placed on a side of the second optical compensation layer 14, which is opposite to the first optical compensation layer 13. As the method of placing the third optical compensation layer, any suitable method can be adopted depending upon the purpose. For example, in the case where the third optical compensation layer is formed of a cholesteric alignment solidified layer, the third optical compensation layer can be attached to the second optical compensation layer via an isocyanate-based adhesive layer (not shown) having a thickness of 2 to 6 μm. Further, for example, in the case where the third optical compensation layer is formed of a resin film, the same means as that of the method of placing the second optical compensation layer can be used.

H. Other Structural Components

The polarizing plate with an optical compensation layer of the present invention may be provided with other optical layers. As the other optical layers, any appropriate optical layers may be employed in accordance with the purpose and the types of image display apparatus. Specific examples thereof include a liquid crystal film, a light scattering film, a diffraction film, and another optical compensation layer (retardation film).

The polarizing plate with the optical compensation layer of the present invention may further include a pressure-sensitive adhesive layer or adhesive layer as an outermost layer on at least one side thereof. In this way, the polarizing plate includes the pressure-sensitive adhesive layer or adhesive layer as an outermost layer, to thereby facilitate lamination with another member (for example, a liquid crystal cell) and prevent peeling off of the polarizing plate from another member. Any appropriate materials may be used as the material for forming the pressure-sensitive adhesive layer. Specific examples of the pressure-sensitive adhesive are described above. Any appropriate materials may be used as the material for forming the adhesive layer. Specific examples of the adhesive layer are described above.

Preferably, a material having excellent moisture absorption property or excellent heat resistance is used for preventing foaming or peeling due to moisture absorption, degradation in optical properties due to difference in thermal expansion or the like, warping of the liquid crystal cell, and the like.

For practical use, a surface of the pressure-sensitive adhesive layer or adhesive layer is covered by any appropriate separator to prevent contamination until the polarizing plate is actually used. The separator may be formed by a method of providing a release coat on any appropriate film by using a releasing agent such as a silicone-based, long chain alkyl-based, or fluorine-based releasing agent, molybdenum sulfide, or the like as required.

Each of the layers of the polarizing plate with an optical compensation layer of the present invention may be subjected to treatment with a UV absorbing agent such as a salicylic ester-based compound, a benzophenone-based compound, a benzotriazole-based compound, a cyanoacrylate-based compound, a nickel complex salt-based compound, or the like, to thereby impart UV absorbing property.

I. Method of Producing a Polarizing Plate with an Optical Compensation Layer

The polarizing plate with an optical compensation layer of the present invention can be produced by laminating each of the above layers via the above adhesive layer or pressure-sensitive adhesive layer. As laminating means, any suitable means can be adopted as long as the angles (the above angles α and β) formed by the optical axes of the respective layers are in the above range. For example, the polarizer, the first optical compensation layer, and the second optical compensation layer, and in the case of placing the third optical compensation layer, the third optical compensation layer are punched to a predetermined size, and the directions thereof are adjusted so that the above angles α and β are in a desired range, whereby they can be laminated via a pressure-sensitive adhesive or an adhesive. By laminating two particular optical compensation layers in such a particular positional relationship, light leakage in a black display of (in particular, a reflection type or a semi-transmissive type) liquid crystal display apparatus of a TN mode, an ECB mode, or a VA mode can be prevented remarkably. A slow axis is not expressed basically in the third optical compensation layer 16, so the precise position adjustment with respect to the absorption axis of the polarizer 12 is not required.

J. Applications of Polarizing Plate with an Optical Compensation Layer

The polarizing plate with the optical compensation layer of the present invention may suitably be used for various image display apparatuses such as a liquid crystal display apparatus and a self-luminous display apparatus. Specific examples of applicable image display apparatuses include a liquid crystal display apparatus, an EL display, a plasma display (PD), and a field emission display (FED). In the case where the polarizing plate with the optical compensation layer of the present invention is used for a liquid crystal display apparatus, the polarizing plate with the optical compensation layer is useful for prevention of light leakage in black display and for compensation of viewing angle. The polarizing plate with the optical compensation layer of the present invention is preferably used for a liquid crystal display apparatus of TN mode, ECB mode, or VA mode, and is particularly preferably used for a reflection-type, transmission-type, or semi-transmissive liquid crystal display apparatus of TN mode, ECB mode, or VA mode. In the case where the polarizing plate with the optical compensation layer of the present invention is used for an EL display, the polarizing plate with the optical compensation layer is useful for prevention of electrode reflection.

As an example of the image display apparatus of the present invention, a liquid crystal display apparatus will be described. As the driving mode of the liquid crystal display apparatus, any suitable driving mode is adopted. A cell of a TN, ECB, or VA mode is preferred. Examples of the TN mode include a twisted nematic (TN) type and a super-twisted nematic (STN) type. The TN mode has a high response speed, and is mostly used in liquid crystal monitors of a laptop PC and inexpensive liquid crystal monitors. The electrically controlled birefringence effect mode (ECB) exhibits a colored display without using a color filter. The VA mode is widely adopted for liquid crystal televisions, mobile telephones, and the like. Further, the liquid crystal display apparatus may be a reflection type or a semi-transmissive type. The polarizing plate with an optical compensation layer of the present invention may be provided on a viewer side or a backlight side of a liquid crystal cell, or on both sides thereof without any limit. For example, a third optical compensation layer in the case where the polarizing plate with an optical compensation layer having a third optical compensation layer is placed on both sides (i.e. the viewer side and the backlight side of a liquid crystal cell) preferably has about a half of the thickness direction retardation value of a third optical compensation layer in the case where the polarizing plate with an optical compensation layer having a third optical compensation layer is placed on only one side of the liquid crystal cell.

Figure 3:
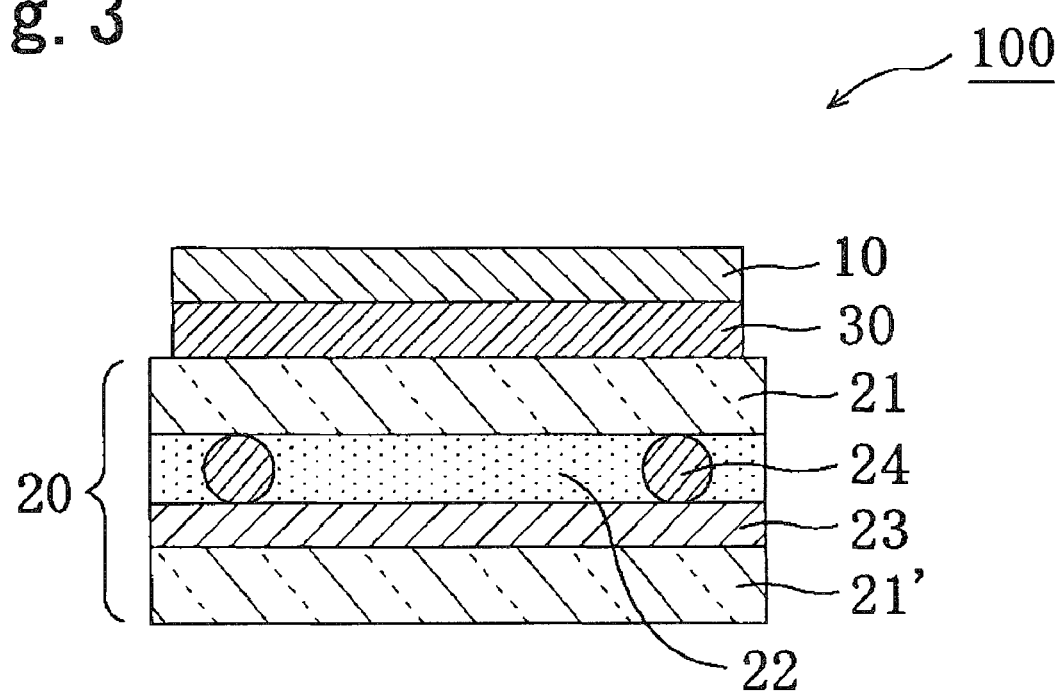
[FIG. 3] A schematic cross-sectional view of a liquid crystal panel used in a liquid crystal display apparatus according to a preferred embodiment of the present invention.

FIG. 3 is a schematic cross-sectional view of a liquid crystal panel according to a preferred embodiment of the present invention. Herein, a liquid crystal panel for a reflection type liquid crystal display apparatus of a TN mode will be described. A liquid crystal panel 100 has a liquid crystal cell 20, a retardation plate 30 placed on an upper side of the liquid crystal cell 20, and a polarizing plate 10 placed on an upper side of the retardation plate 30. As the retardation plate 30, any suitable retardation plate can be adopted depending upon the purpose and the alignment mode of the liquid crystal cell. The retardation plate 30 can be omitted depending upon the purpose and the alignment mode of the liquid crystal cell. The above polarizing plate 10 is a polarizing plate with an optical compensation layer of the present invention. When the polarizing plate with an optical compensation layer of the present invention is used as the polarizing plate 10, the retardation plate 30 can be omitted. The liquid crystal cell 20 includes a pair of glass substrates 21, 21', and a liquid crystal layer 22 as a display medium placed between the substrates. A reflective electrode 23 is provided on the liquid crystal layer 22 side of a lower substrate 21'. A color filter (not shown) is provided on the upper substrate 21. An interval (cell gap) between the substrates 21, 21' is controlled by spacers 24.

For example, in the case of the TN mode, liquid crystal molecules in the liquid crystal layer 22 are aligned so as to shift a polarization axis by 90° under no voltage application in the liquid crystal display apparatus 100. In such a state, incident light only in one direction transmitted by the polarizing plate 10 is twisted by 90° by the liquid crystal molecules and is reflected by the reflective electrode 23 as it is. The light is twisted by 90° by the liquid crystal molecules in the liquid crystal layer 22 again and is output from the polarizing plate 10. Thus, under no voltage application, the liquid crystal display apparatus 100 expresses a white display (normally white mode). On the other hand, when a voltage is applied to the liquid crystal display apparatus 100, the alignment of the liquid crystal molecules in the liquid crystal layer 12 changes. As a result, the light reflected from the reflective electrode 23 is absorbed by the polarizing plate 10, whereby a black display is expressed. Such switching of a display is performed for each pixel using active elements, whereby an image is formed.

The application of the liquid crystal panel, the liquid crystal display apparatus, and the like of the present invention is not particularly limited. The liquid crystal panel and the liquid crystal display apparatus can be suitably applied for various use in: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; on-vehicle devices such as a back monitor, a car navigation system monitor, and a car audio; display device such as a commercial information monitor; security device such as a surveillance monitor; and nursing care and medical devices such as a nursing monitor and a medical monitor.

Particularly preferably, the liquid crystal panel, the liquid crystal display apparatus, and the like of the present invention are preferably used for mobile products such as portable devices, on-vehicle devices, and the like.

Hereinafter, the present invention will be more specifically described by examples. However, the present invention is not limited to the examples. Methods of measuring characteristics in the examples are as described below.

(1) Measurement of a Thickness

The thickness was measured with a microgauge-type thickness meter manufactured by Mitsutoyo Corporation. The thickness of a hardcoat film in which a hardcoat layer is provided on a transparent film base material was measured, and the thickness of the base material was subtracted from the obtained thickness to calculate the film thickness of the hardcoat layer.

(2) Measurement of Pencil Hardness

The hardcoat layer was placed on a glass plate so that the base material side of the hardcoat layer faced the glass plate, and the surface of the hardcoat layer was tested in accordance with a pencil hardness test (load: 500 g) described in JIS K-5400.

(3) Measurement of Abrasion Resistance

The value with respect to the degree of abrasion resistance of the hardcoat layer was measured in accordance with the following test contents. First, a hardcoat layer was cut into a size of 150 mm×50 mm to produce a sample. The sample was placed on a glass plate, and an initial haze value was obtained. Then, Steel Wool #0000 was attached uniformly to the smooth cross-section of a cylinder with a diameter of 25 mm, and reciprocated on the surface of the sample 200 times and 1000 times at a load of 1.5 kg and a rate of about 100 mm per second. After that, the haze value of the hardcoat layer after the test was obtained by the above method. The value obtained by subtracting the initial haze value from the haze value after the test was defined as an index for abrasion resistance. A hardcoat layer whose surface is liable to be damaged has a larger index.

(4) Measurement of a Retardation Value

The refractive index of the optical compensation layer was obtained by measuring each refractive index of nx, ny, and nz with an automatic birefringence measuring device (manufactured by Oji Scientific Instruments, an elliptical polarizing plate measurement mode, λ=590 nm of automatic birefringence measuring device KOBRA-31PEW).

(5) Evaluation of Moist Heat Resistance

A retardation value under humidity was obtained by cutting a polarizing plate with an optical compensation layer into a size with a width of 25 mm and a length of 100 mm to produce a sample, attaching the sample to a glass plate so that air, foreign matter, and the like are not mixed, and measuring the retardation of the resultant sample using an automatic birefringence measuring device KOBRA31PRW (elliptical polarizing plate measurement mode) manufactured by Oji Scientific Instruments. The sample was allowed to stand for 500 hours under the condition of 60° C. and 95% RH, and thereafter, the retardation value thereof was measured. The change amount of the retardation before and after the humidification was defined as an index for moist heat resistance.

EXAMPLE 1

Production of a Hardcoat Layer

First, 100 parts of urethane acrylate composed of pentaerythritol-based acrylate and hydrogenated xylenediisocyanate as urethane acrylate (herein after, referred to as A component), 49 parts of dipentaerythritol hexaacrylate (herein after, referred to as B1 component), 41 parts of pentaerythritol tetraacrylate (herein after, referred to as B2 component), and 24 parts of pentaerythritol triacrylate (herein after, referred to as B3 component) as polyol (meth)acrylate (herein after, referred to as B component), and 59 parts of a (meth)acrylic polymer having 2-hydroxyethyl group and 2,3-dihydroxypropyl group as a (meth)acrylic polymer having an alkyl group containing at least two hydroxyl groups (herein after, referred to as C component) were added. Then, 3 parts of a polymerization initiator (Irgacure 184) and 0.5 parts of a reactive leveling agent were mixed with respect to those total resin components, whereby a solid content of a hardcoat layer-forming material was produced. The solid content was diluted with a mixed solvent in which butyl acetate and ethyl acetate were mixed in a ratio (weight ratio) of 46:54 (54 parts by weight of ethyl acetate with respect to 100 parts by weight of an entire solvent) so that the concentration of the solid content became 50%, whereby a hardcoat layer-forming material was prepared. The above reactive leveling agent is a copolymer obtained by copolymerizing dimethylsiloxane, hydroxypropylsiloxane, 6-isocyanatehexyl isocyanurate, and aliphatic polyester at a molar ratio of 6.3:1.0:2.2:1.0.

Figure 4:
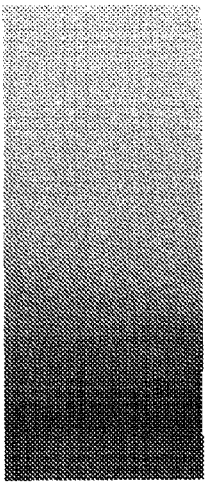
[FIG. 4] Surface observation results of hardcoat layers in Example 1 and Comparative Example 1 before and after measurement of an abrasion resistance test.

The above hardcoat layer-forming material was applied to a triacetylcellulose (TAC) film (manufactured by FUJIFILM Corporation, thickness: 80 μm, refractive index: 1.48) with a bar coater, followed by heating at 100° C. for one minute, whereby a coating film was dried. After that, the film was cured by irradiation of UV-light at an integrated light amount of 300 mJ/cm$^2$ with a metal halide lamp, whereby a hardcoat layer was formed. The thickness of the obtained hardcoat layer was 20 μm and the pencil hardness thereof was 4H. Further, the surface observation results before and after the measurement of an abrasion resistance test of the obtained hardcoat layer are shown in FIG. 4 together with the results in Comparative Example 1.

(Production of Polarizer)

A commercially available polyvinyl alcohol (PVA) film (VF-PS, manufactured by KURARAY CO., LTD.) was colored in an aqueous solution containing iodine and then uniaxially stretched about 6 times between rolls of different speed ratios in an aqueous solution containing boric acid, whereby a continuous polarizer (having a thickness of 30 μm) was obtained. As a protective layer, a commercially available TAC film (manufactured by FUJIFILM Corporation, having a thickness of 80 μm) was stuck to one side of the polarizer using a PVA-based adhesive. The polarizer was punched into a size of 20 cm (longitudinal)×30 cm (lateral). At this time, the polarizer was punched so that the absorption axis of the polarizer was in a longitudinal direction.

(Production of a First Optical Compensation Layer)

A long norbornene-based resin film (Zeonor (trade name) manufactured by Zeon Corporation, thickness: 40 μm, photoelastic coefficient: $3.10 \times 10^{-12}$ $m^2/N$) was stretched uniaxially by 2.25 times at 140° C., whereby a long film for a first optical compensation layer. The thickness of the film was 35 μm, and the in-plane retardation $Re_1$ thereof was 260 nm. The film was punched into a size of 20 cm (longitudinal)×30 cm (lateral). At this time, the film was punched so that the slow axis was in a longitudinal direction.

(Production of a Second Optical Compensation Layer)

A long norbornene-based resin film (Zeonor (trade name) manufactured by Zeon Corporation, thickness: 40 μm, photoelastic coefficient: $3.10 \times 10^{-12}$ $m^2/N$) was stretched uniaxially by 1.52 times at 140° C., whereby a long film for a second optical compensation layer. The thickness of the film was 35 μm, and the in-plane retardation $Re_2$ thereof was 140 nm. The film was punched into a size of 20 cm (longitudinal)×30 cm (lateral).

(Production of a Polarizing Plate with an Optical Compensation Layer)

The hardcoat layer, the polarizer, the first optical compensation layer, and the second optical compensation layer obtained in the above were laminated in this stated order. Herein, they were laminated so that the respective slow axes of the first optical compensation layer and the second optical compensation layer were at 15° and 75° in a counterclockwise direction with respect to the absorption axis of the polarizer. The base material (TAC film that is to be a protective layer finally) side of the hardcoat layer was laminated on the polarizer using a PVA-based adhesive. The side of the polarizer where the hardcoat layer was not laminated and the first optical compensation layer, and the first optical compensation layer and the second optical compensation layer were laminated using an acrylic pressure-sensitive adhesive (thickness: 20 μm). Finally, the laminate was punched into a size of 4.0 cm (longitudinal)×5.3 cm (lateral), whereby a polarizing plate with an optical compensation layer as shown in FIG. 1(a) was obtained.

Figure 5:
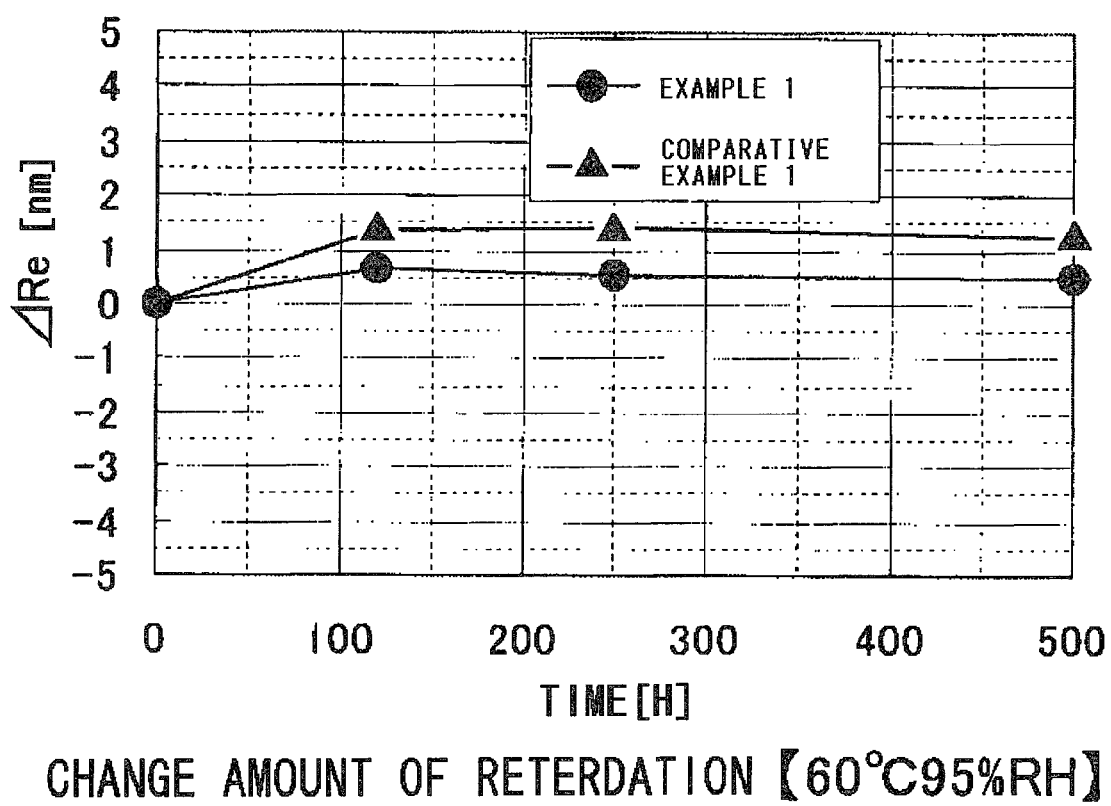
[FIG. 5] Results of a moist heat resistance test of polarizing plates with an optical compensation layer of Example 1 and Comparative Example 1.

The results of the moist heat resistance test of the obtained polarizing plate with an optical compensation layer are shown in FIG. 5 together with the results of Comparative Example 1.

EXAMPLE 2

First, 100 parts by weight of urethane acrylate (herein after, referred to as A1 component) composed of pentaerythritol-based acrylate and isophorone diisocyanate as an A component, 59 parts by weight of a B1 component, 37 parts by weight of a B2 component, and 15 parts by weight of a B3 component as B components, 26 parts by weight of a (meth) acrylic polymer having a 2-hydroxyethyl group and a 2,3-dihydroxypropyl group as a C component, and 2 parts by weight of a polymerization initiator (Irgacure 184) with respect to the total resin components were used to produce a hardcoat layer in the same way as in Example 1. The thickness of the obtained hardcoat layer was 20 μm, and the pencil hardness thereof was 4H. A polarizing plate with an optical compensation layer was produced in the same way as in Example 1, except for using the obtained hardcoat layer.

EXAMPLE 3

A hardcoat layer was produced in the same way as in Example 1, except for using 100 parts by weight of the A1 component as an A component, 38 parts by weight of the B1 component, 40 parts by weight of the B2 component, and 16 parts by weight of the B3 component as B components, 30 parts by weight of a (meth) acrylic polymer having a 2-hydroxyethyl group and a 2,3-dihydroxypropyl group as a C component, and 3.5 parts by weight of a polymerization initiator (mixture of 1 part by weight of Irgacure 184 and 2.5 parts by weight of 2,4,6-trimethylbenzoinphenylphosphin oxide) with respect to the total resin components. The thickness of the obtained hardcoat layer was 20 μm, and the pencil hardness thereof was 4H. A polarizing plate with an optical compensation layer was produced in the same way as in Example 1, except for using the obtained hardcoat layer.

COMPARATIVE EXAMPLE 1

A urethane-acrylic hardcoat material (conventional hardcoat material for a liquid crystal display apparatus) manufactured by Nippon Paper Co., Ltd. was applied to a triacetylcellulose (TAC) film (manufactured by FUJIFILM Corporation, thickness: 80 μm, refractive index: 1.48) with a bar coater so that the thickness became 5 mm, followed by heating at 100° C. for one minute, whereby a coating film was dried. After that, the coating film was irradiated with UV-light at an integrated light amount of 300 $mJ/cm^2$ with a metal halide lamp, whereby a hardcoat layer was formed. The thickness of the hardcoat layer was 5 μm, and the pencil hardness thereof was 3H. Further, the surface observation results before and after the measurement of an abrasion resistance test of the obtained hardcoat layer are shown in FIG. 4 together with the results in Example 1.

A polarizing plate with an optical compensation layer was produced in the same way as in Example 1 except for using the above hardcoat layer. The results of the moist heat resistance test of the obtained polarizing plate with an optical compensation layer are shown in FIG. 5 together with the results of Example 1.

COMPARATIVE EXAMPLE 2

A hardcoat layer was produced in the same way as in Comparative Example 1 except for applying the material so that the thickness of the hardcoat layer to be obtained became 20 μm. As a result, the hardcoat layer was curled largely, which was not able to be used practically.

EXAMPLE 4

First, 54 parts of tetraalkoxysilane, 23 parts of a silane coupling agent having a fluoroalkyl structure and polysiloxane structure, and 23 parts of hollow spherical silicon oxide ultra-fine particles with a diameter of 60 nm, which was made hydrophobic by a surface treatment using a silane coupling agent having an acrylic group were dispersed in a mixed solvent of isopropyl alcohol/butyl acetate/methylisobutylketone (54/14/32 (parts by weight)), and the concentration of a solid content was adjusted to 2.0% by weight, whereby an antireflection layer-forming material was obtained.

The obtained antireflection layer-forming material was applied to the hardcoat layer (opposite surface with respect to the adjacent TAC film) obtained in Example 1. The antireflection layer-forming material was applied with a die coater so that a thickness of an antireflection layer is 100 nm. The material was dried and cured by heating at 120° C. for 3 minutes, whereby an antireflection layer (refractive index: 1.38) was formed. A polarizing plate with an optical compensation layer was produced in the same way as in Example 1, except for using the hardcoat layer with such an antireflection layer formed thereon.

EXAMPLE 5

A polarizing plate with an optical compensation layer was produced in the same way as in Example 1 except for using, as a second optical compensation layer, a biaxial retardation film obtained by stretching a norbornene-based resin film (Arton (trade name) manufactured by JSR, thickness: 100 μm, photoelastic coefficient: $5.00 \times 10^{-12}$ m$^2$/N) at 150° C. three times by fixed-end biaxial stretching (fixed in a longitudinal direction, and stretched three times in a lateral direction). The thickness of the biaxial retardation film thus used was 50 μm, the in-plane retardation $Re_2$ thereof was 140 nm, and the thickness direction retardation $Rth_2$ thereof was 170 nm.

[Evaluation]

From the results shown in FIG. 4, the damages in the abrasion resistance test are remarkably smaller in Example 1 than in Comparative Example 1. From this, it is understood that the polarizing plate with an optical compensation layer of the present invention is remarkably excellent in abrasion resistance, compared with the conventional polarizing plate with an optical compensation layer. Further, from the results shown in FIG. 5, in Example 1, the change amount of a retardation after the elapse of 500 hours is about 0.5 (nm), where as the change amount of a retardation in Comparative Example 1 is about 1.3 (nm). When the change amount of a retardation is larger than about 1 (nm), the decrease in practical display properties is recognized. The polarizing plate with an optical compensation layer of the present invention has the change amount of a retardation smaller than 1 (nm), so it has moist heat resistance properties in which the decrease in display properties is not recognized even during the use under high temperature and high humidity. This is conceived to be caused by the properties of the hardcoat layer used in the present invention.

INDUSTRIAL APPLICABILITY

The polarizing plate with an optical compensation layer of the present invention may suitably be used for various image display apparatuses (such as a liquid crystal display apparatus and a self-luminous display apparatus).

The invention claimed is:

1. A polarizing plate with an optical compensation layer, comprising:
a hardcoat layer;
a polarizer;
a first optical compensation layer placed so that a slow axis thereof intersects with an absorption axis of the polarizer; and
a second optical compensation layer placed so that a slow axis thereof intersects with the absorption axis of the polarizer in the stated order, wherein:
the first optical compensation layer provides a substantially ½ retardation with respect to a wavelength of monochromatic light;
the second optical compensation layer provides a substantially ¼ retardation with respect to a wavelength of monochromatic light; and
the hardcoat layer contains urethaneacrylate, polyol(meth) acrylate, and (meth)acrylic polymer having an alkyl group containing at least two hydroxyl groups.

2. The polarizing plate with an optical compensation layer according to claim 1, wherein the polyol(meth)acrylate contained in the hardcoat layer contains pentaerythritol triacrylate and pentaerythritol tetraacrylate.

3. The polarizing plate with an optical compensation layer according to claim 1, wherein the hardcoat layer has a thickness of 15 μm to 50 μm.

4. The polarizing plate with an optical compensation layer according to claim 1, wherein the first optical compensation layer contains a resin with an absolute value of a photoelastic coefficient of $2.0 \times 10^{-11}$ m$^2$/N or less and has a relationship of $nx_1 > ny_1 = nz_1$ and an in-plane retardation $Re_1$ of 200 to 300 nm.

5. polarizing plate with an optical compensation layer according to claim 1, wherein the second optical compensation layer contains a resin with an absolute value of a photoelastic coefficient of $2.0 \times 10^{-11}$ m$^2$/N or less and has a relationship of $nx_2 > ny_2 = nz_2$ and an in-plane retardation $Re_2$ of 90 to 160 nm.

6. The polarizing plate with an optical compensation layer according to claim 1, wherein each of the first optical compensation layer and the second optical compensation layer comprises a stretched film obtained by uniaxially stretching a polymer film containing a norbornene-based resin.

7. The polarizing plate with an optical compensation layer according to claim 1, further comprising a protective layer on at least one side of the polarizer.

8. The polarizing plate with an optical compensation layer according to claim 1, wherein the polarizer, the first optical compensation layer, and the second optical compensation layer are placed via a pressure-sensitive adhesive layer.

9. The liquid crystal panel, comprising the polarizing plate with an optical compensation layer according to claim 1, and a liquid crystal cell.

10. The liquid crystal panel according to claim 9, wherein the liquid crystal cell employs a TN mode, an ECB mode, or a VA mode.

11. A liquid crystal display apparatus comprising the liquid crystal panel according to claim 9.

12. An image display apparatus comprising the polarizing plate with an optical compensation layer according to claim 1.

13. A liquid crystal display apparatus comprising the liquid crystal panel according to claim 10.

* * * * *